US009594981B2

(12) United States Patent
Sorakado et al.

(10) Patent No.: US 9,594,981 B2
(45) Date of Patent: Mar. 14, 2017

(54) IMAGE SEARCH APPARATUS AND CONTROL METHOD THEREOF

(71) Applicant: CANON KABUSHIKI KAISHA, Tokyo (JP)

(72) Inventors: Hideki Sorakado, Asaka (JP); Hirotaka Shiiyama, Yokohama (JP); Masahiro Matsushita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 14/680,118

(22) Filed: Apr. 7, 2015

(65) Prior Publication Data
US 2015/0294187 A1    Oct. 15, 2015

(30) Foreign Application Priority Data

Apr. 14, 2014   (JP) .................. 2014-083095
Apr. 14, 2014   (JP) .................. 2014-083097

(51) Int. Cl.
*G06K 9/00*   (2006.01)
*G06K 9/62*   (2006.01)
*G06K 9/46*   (2006.01)
*G06F 17/30*  (2006.01)

(52) U.S. Cl.
CPC ..... *G06K 9/6215* (2013.01); *G06F 17/30247* (2013.01); *G06K 9/4604* (2013.01)

(58) Field of Classification Search
CPC ............... G06K 9/4604; G06K 9/6215; G06F 17/30247
See application file for complete search history.

(56) References Cited

U.S. PATENT DOCUMENTS

| 8,457,446 B2* | 6/2013 | Magai | G06K 9/033 358/403 |
| 9,075,827 B2* | 7/2015 | Magai | G06K 9/033 |
| 2007/0110338 A1* | 5/2007 | Snavely | G06F 17/30274 382/305 |
| 2007/0143272 A1* | 6/2007 | Kobayashi | G06F 17/30247 |
| 2011/0058746 A1* | 3/2011 | Magai | G06K 9/033 382/195 |

(Continued)

FOREIGN PATENT DOCUMENTS

JP   2009-284084 A   12/2009
JP   4921202 B2      4/2012

OTHER PUBLICATIONS

Harris et al.,"A combined corner and edge detector," In Alvey Vision Conference, pp. 147-152, 1988.

(Continued)

*Primary Examiner* — Aaron W Carter
(74) *Attorney, Agent, or Firm* — Carter, DeLuca, Farrell & Schmidt, LLP

(57) ABSTRACT

This invention suppresses bloating of indices for an image search. To accomplish this, when a target image to be registered is given, an apparatus described in this specification executes partial image search processing using the target image to be registered as a query image. As a result, if a corresponding image is found, and an already registered image includes the query image, the target image to be registered is registered as an image linked to the already registered image.

13 Claims, 32 Drawing Sheets

(56) References Cited

U.S. PATENT DOCUMENTS

| | | | | |
|---|---|---|---|---|
| 2012/0062597 | A1* | 3/2012 | Mori | G06F 17/30268 |
| | | | | 345/636 |
| 2013/0251268 | A1* | 9/2013 | Magai | G06K 9/033 |
| | | | | 382/195 |
| 2015/0294187 | A1* | 10/2015 | Sorakado | G06K 9/6215 |
| | | | | 382/195 |
| 2015/0379368 | A1* | 12/2015 | Shiiyama | G06K 9/6215 |
| | | | | 382/201 |

OTHER PUBLICATIONS

David G. Lowe, "Distinctive Image Features from Scale-Invariant Keypoints," International Journal of Computer Vision, 60, 2 (2004), pp. 1-28.
Fischler et al., "Random sample consensus: A paradigm for model fitting with applications to image analysis and automated cartography" Commun. of the ACM, vol. 24, No. 6, pp. 381-395, Jun. 1981.
Koenderink et al., "Representation of local geometry in the visual system," Biological Cybernetics, vol. 55, pp. 367-375, 1987.

* cited by examiner

| REFERENCE CONTENT ID | NUMBER OF LINKS | LINK IMAGE LIST | REGION INFORMATION | NUMBER OF FEATURE AMOUNTS |
|---|---|---|---|---|
| A | 2 | 1, 2 | [(0, 0)–(640, 480)], [(100, 80)–(550, 450)] | 2000, 500 |
| ... | ... | ... | ... | ... |

| QUANTIZATION VALUE | LIST OF (REFERENCE CONTENT IDS, X-COORDINATES, AND Y-COORDINATES) |
|---|---|
| 1001 | (A, 100, 200) |
| 1002 | (A, 105, 205), (3, 100, 150) |
| ... | ... |

701    702

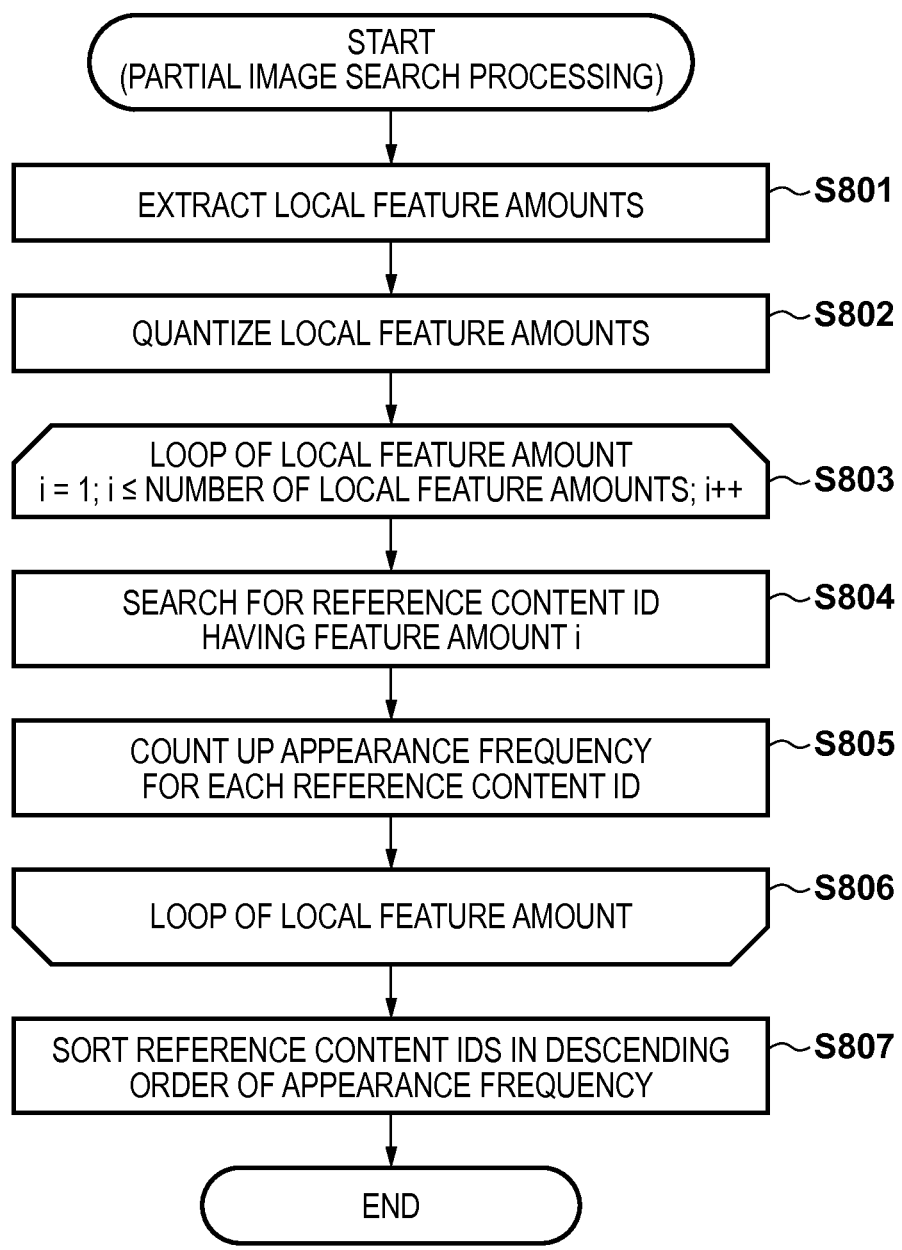

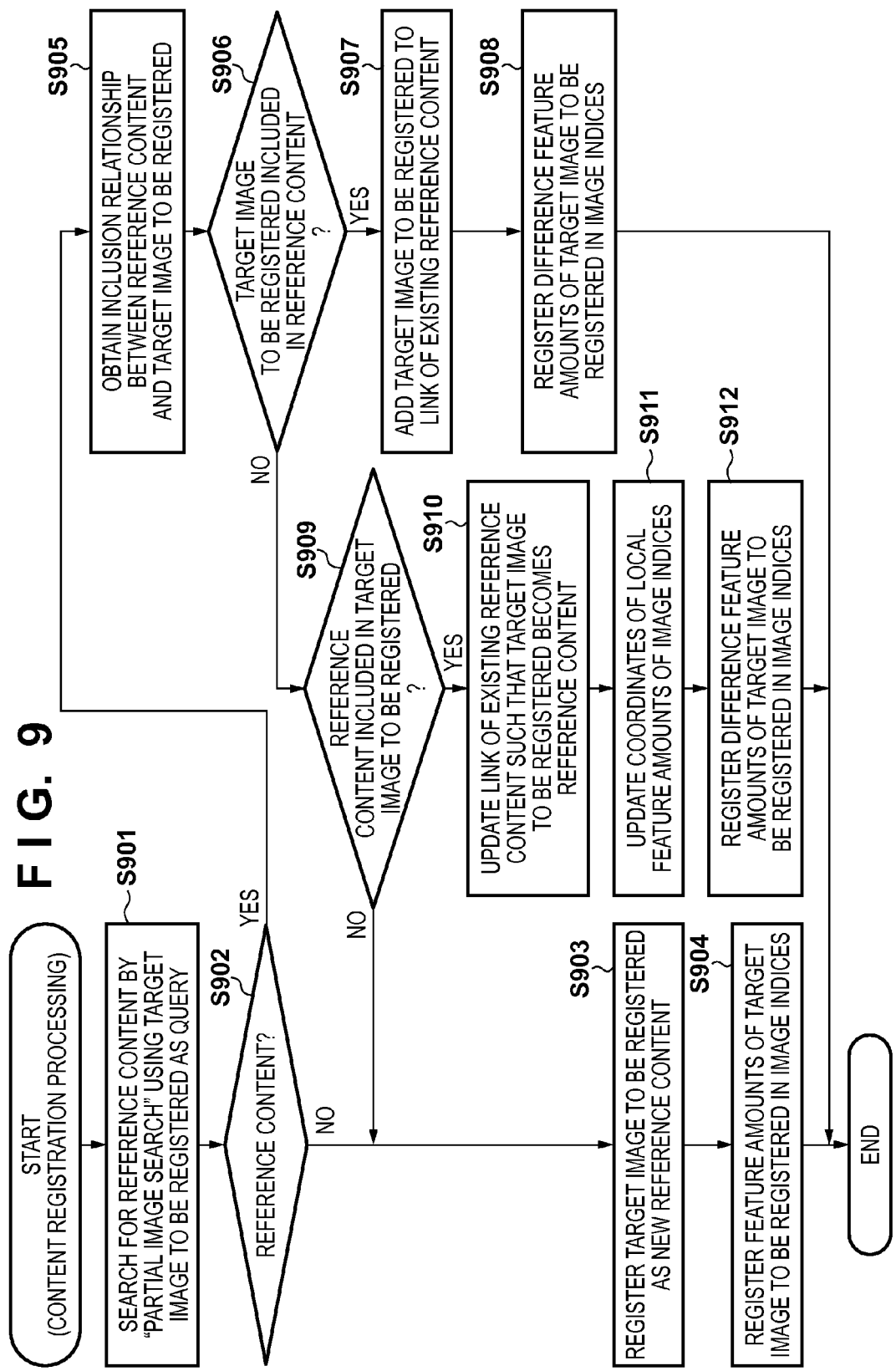

ALLOCATION IMAGE
INCLUDING TWO PAGES

ALLOCATION IMAGE
INCLUDING FOUR PAGES

ALLOCATION IMAGE
INCLUDING SIX PAGES

ALLOCATION IMAGE
INCLUDING EIGHT PAGES

ALLOCATION IMAGE
INCLUDING NINE PAGES

ALLOCATION IMAGE
INCLUDING 16 PAGES

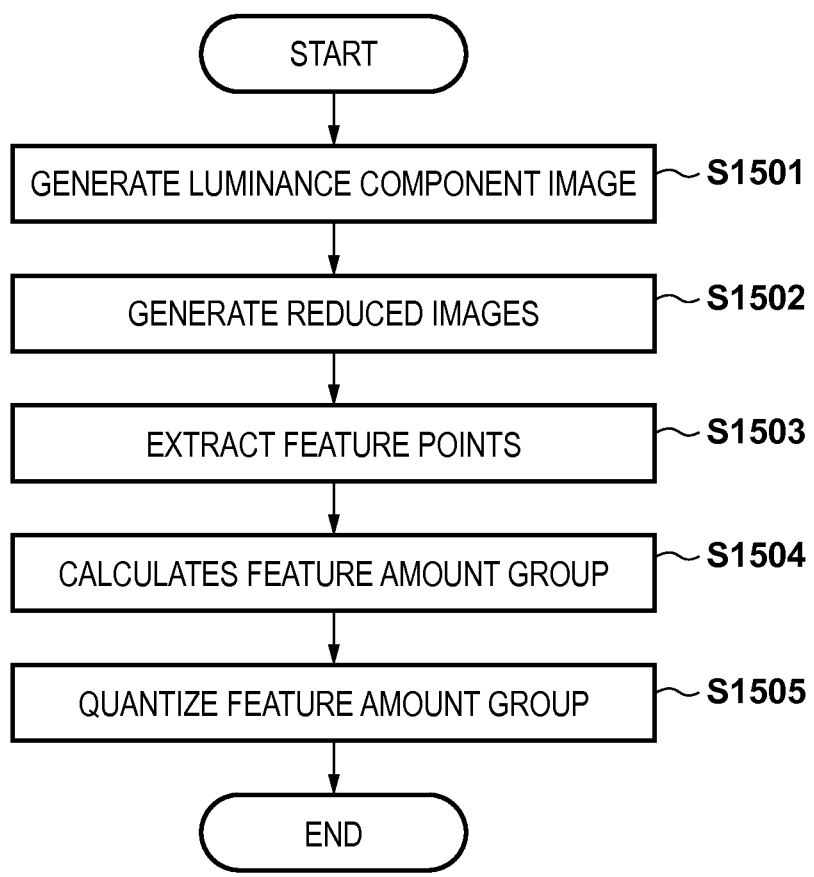

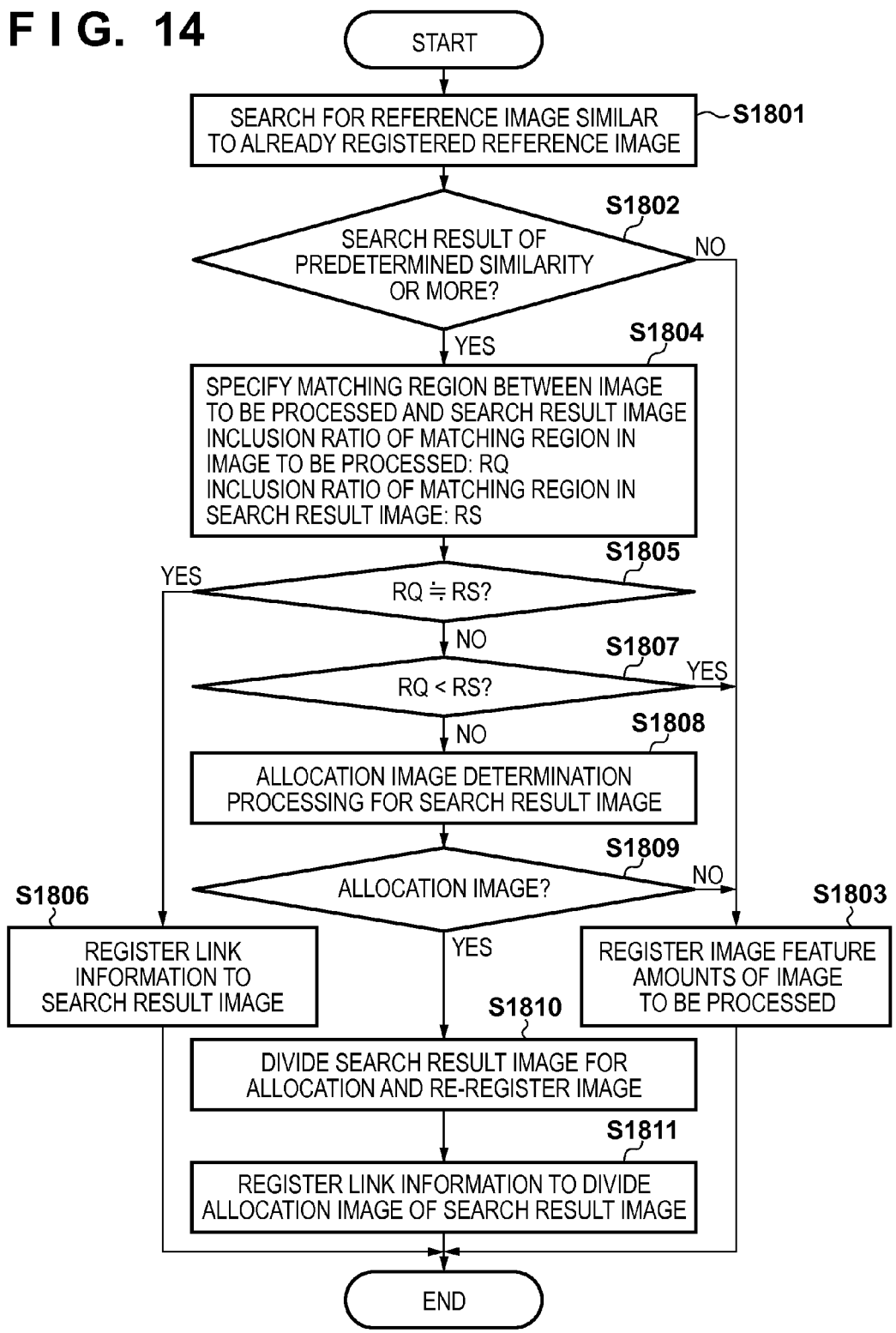

FIG. 15A  ASSOCIATION BETWEEN REFERENCE IMAGE ID AND IMAGE ID

| REFERENCE IMAGE ID | IMAGE ID | REGION INFORMATION |
|---|---|---|
| 1 | 1 | (0, 0, 2479, 3506) |
| 2 | 2 | (0, 0, 1753, 2479) |
| 3 | 2 | (1754, 0, 3506, 2479) |
| 4 | 3 | (0, 0, 500, 500) |
| 5 | 4 | (0, 0, 3506, 2479) |
| ... | | |

FIG. 15B  ASSOCIATION BETWEEN FEATURE AMOUNT ID AND REFERENCE IMAGE ID

| FEATURE AMOUNT ID | REFERENCE IMAGE ID LIST | FEATURE POINT COORDINATE LIST | IMAGE FEATURE AMOUNT LIST |
|---|---|---|---|
| 1 | 1, 5, ...... | (123, 456), (285, 147), ... | (0.08, ...), (0.07, ...), ... |
| 2 | 3, ...... | ((256, 358), (348, 615)), ... | (0.15, ...), (0.12, ...), ... |
| 3 | 2, ...... | (128, 1024), ... | (0.25, ...), ... |
| 4 | 5 | (2541, 332) | (0.34, ...), ... |
| 5 | 4 | (153, 111) | (0.47, ...), ... |
| 6 | | | |
| ... | | | |

FIG. 17

ASSOCIATION BETWEEN REFERENCE IMAGE ID AND IMAGE ID

| REFERENCE IMAGE ID | IMAGE ID | REGION INFORMATION |
|---|---|---|
| 1 | 1, 5 | (0, 0, 2479, 3506), (0, 0, 2479, 3506) |
| 2 | 2 | (0, 0, 1753, 2479) |
| 3 | 2 | (1754, 0, 3506, 2479) |
| 4 | 3 | (0, 0, 500, 500) |
| 5 | 4 | (0, 0, 3506, 2479) |
| ... | | |

FIG. 19

| NUMBER OF ALLOCATIONS | RATIO | ROTATION | CENTER x-COORDINATE | CENTER y-COORDINATE |
|---|---|---|---|---|
| 2 | 50.0% | Yes | (0.25, 0.75) | (0.5) |
| 4 | 25.0% | No | (0.25, 0.75) | (0.25, 0.75) |
| 6 | 12.5% | Yes | (0.167, 0.5, 0.833) | (0.25, 0.75) |
| 8 | 12.5% | Yes | (0.125, 0.375, 0.625, 0.875) | (0.25, 0.75) |
| 9 | 11.1% | No | (0.167, 0.5, 0.833) | (0.167, 0.5, 0.833) |
| 16 | 6.3% | No | (0.125, 0.375, 0.625, 0.875) | (0.125, 0.375, 0.625, 0.875) |

FIG. 22A

ASSOCIATION BETWEEN REFERENCE IMAGE ID AND IMAGE ID

| REFERENCE IMAGE ID | IMAGE ID | REGION INFORMATION |
|---|---|---|
| 1 | 1 | (0, 0, 2479, 3506) |
| 2 | 2 | (0, 0, 1753, 2479) |
| 3 | 2 | (1754, 0, 3506, 2479) |
| 4 | 3 | (0, 0, 500, 500) |
| 6 | 4, 5 | (0, 0, 1753, 2479), (0, 0, 2479, 3506) |
| 7 | 4 | (1754, 0, 3506, 2479) |
| ... | | |

FIG. 22B

ASSOCIATION BETWEEN FEATURE AMOUNT ID AND REFERENCE IMAGE ID

| FEATURE AMOUNT ID | REFERENCE IMAGE ID LIST | FEATURE POINT COORDINATE LIST | IMAGE FEATURE AMOUNT LIST |
|---|---|---|---|
| 1 | 1, 6, ... | (123, 456), (285, 147), ... | (0.08, ...), (0.07, ...), ... |
| 2 | 3, ... | ((256, 358), (348, 615)), ... | (0.15, ...), (0.12, ...), ... |
| 3 | 2, ... | (128, 1024), ... | (0.25, ...), ... |
| 4 | 7 | (2541, 332) | (0.34, ...), ... |
| 5 | 4 | (153, 111) | (0.47, ...), ... |
| 6 | | | |
| ... | | | |

| FEATURE AMOUNT ID OF COMPARISON SOURCE IMAGE | FEATURE AMOUNT ID OF COMPARISON DESTINATION IMAGE | FEATURE POINT COORDINATES OF COMPARISON SOURCE IMAGE | FEATURE AMOUNT COORDINATES OF COMPARISON DESTINATION IMAGE |
|---|---|---|---|
| Q1 | S1 | (x'1, y'1) | (x1, y1) |
| Q2 | S2 | (x'2, y'2) | (x2, y2) |
| ... | ... | ... | ... |
| Qm | Sm | (x'm, y'm) | (xm, ym) |

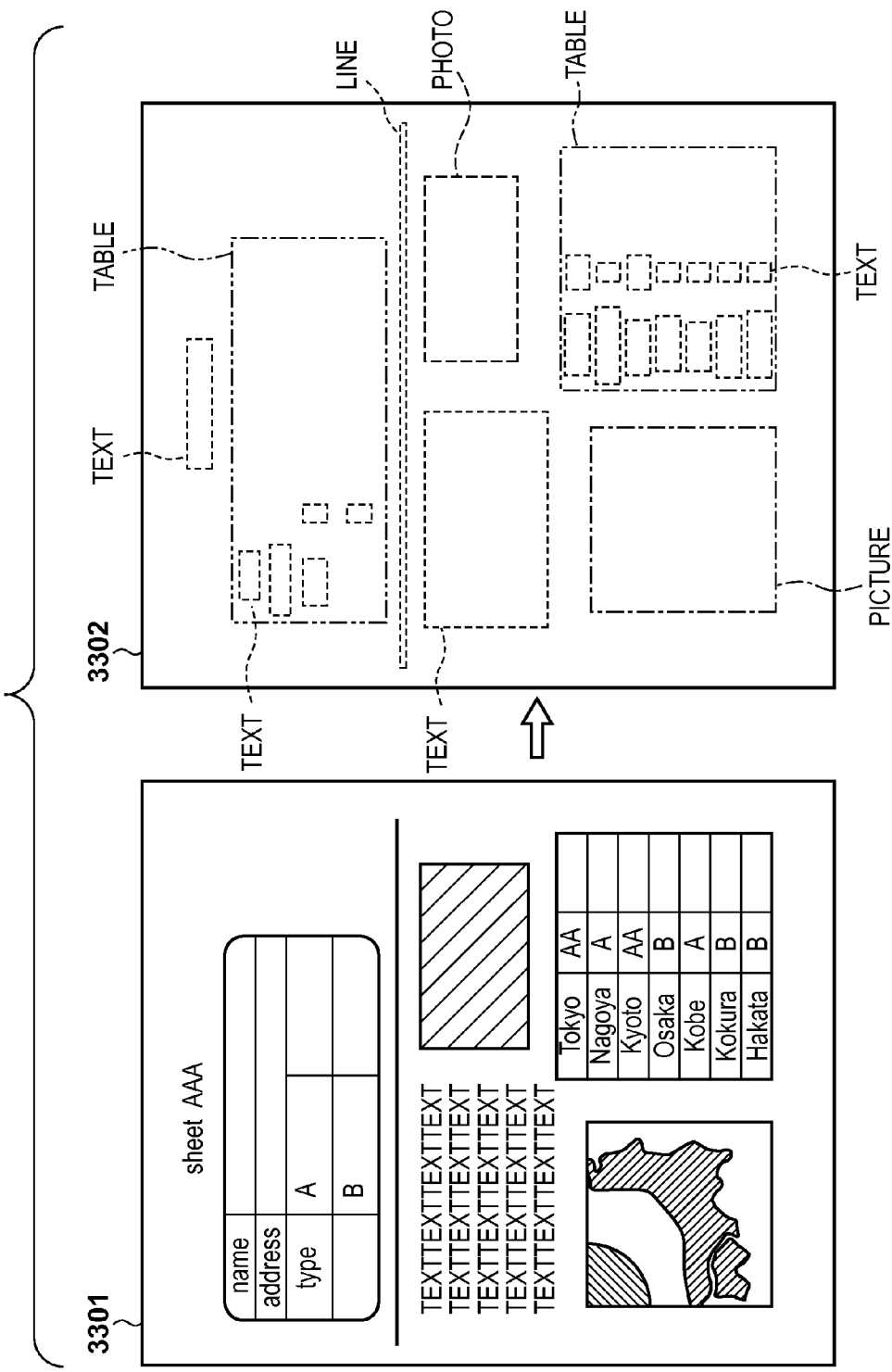

ALLOCATION IMAGE INCLUDING TWO PAGES

PARTING LINE — 3501

ALLOCATION IMAGE INCLUDING FOUR PAGES

ALLOCATION IMAGE INCLUDING SIX PAGES

ALLOCATION IMAGE INCLUDING EIGHT PAGES

ALLOCATION IMAGE INCLUDING NINE PAGES

ALLOCATION IMAGE INCLUDING 16 PAGES

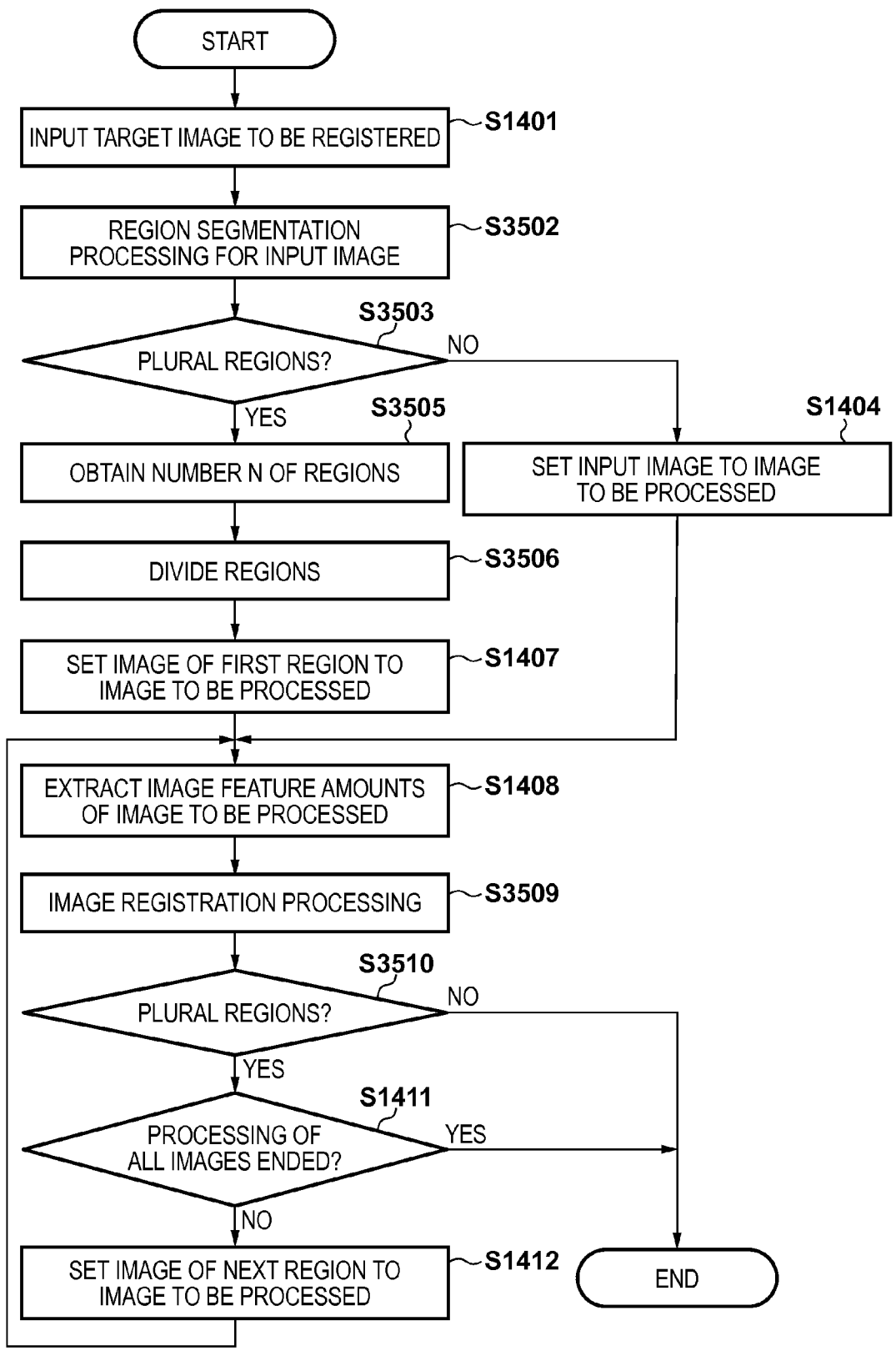
F I G. 31

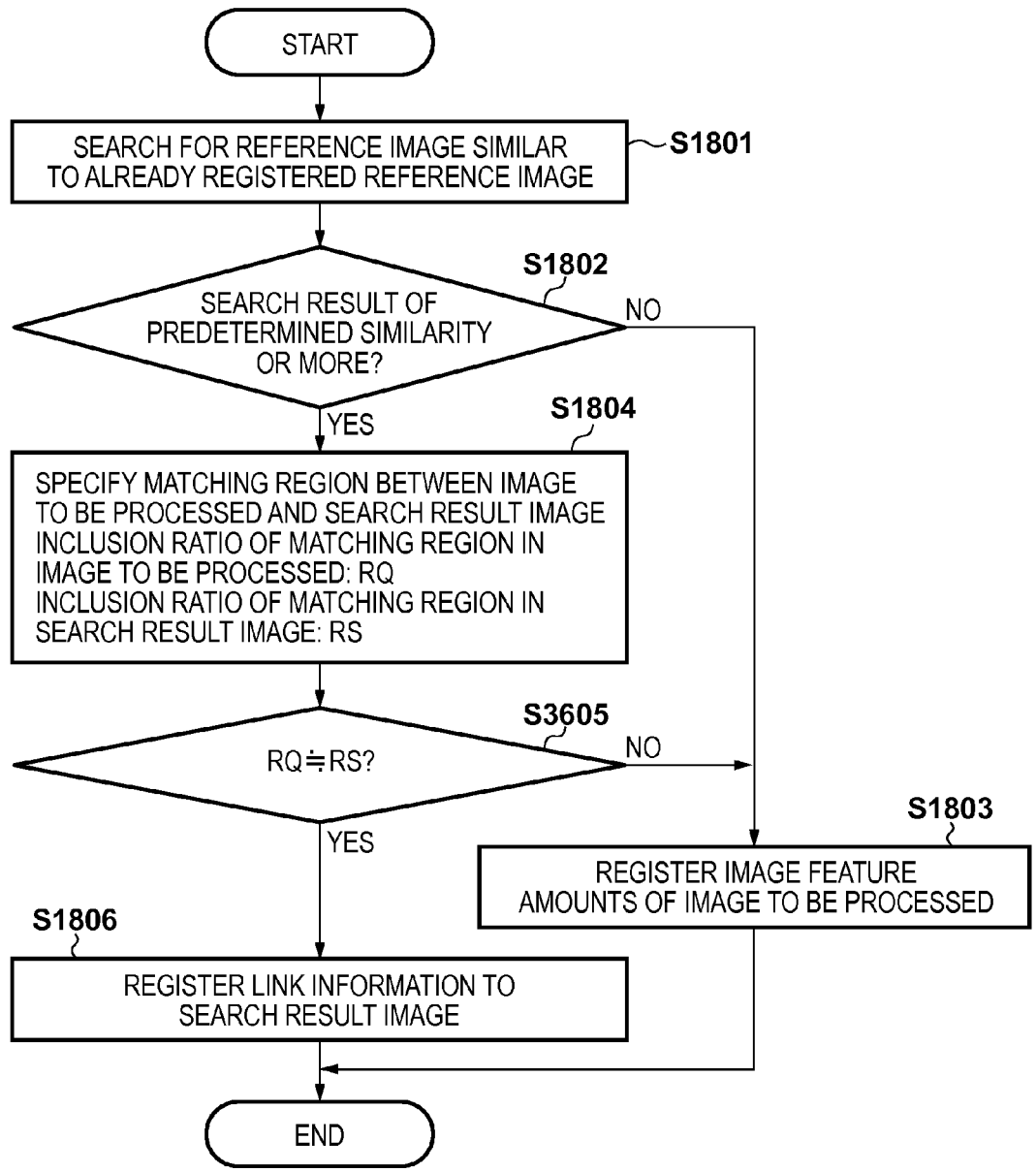

IMAGE SEARCH APPARATUS AND CONTROL METHOD THEREOF

BACKGROUND OF THE INVENTION

Field of the Invention

The present invention relates to an image search technique using the local feature amounts of an image.

Description of the Related Art

There has been proposed a method of searching for a similar image using the local feature amounts of an image. In this method, first, feature points (local feature points) are extracted from an image (non-patent literature 1). Next, feature amounts (local feature amounts) corresponding to the local feature points are calculated based on the local feature points and image information on the periphery (non-patent literature 2).

In the method using the local feature amounts, each local feature amount is defined as information constructed by a plurality of elements that are rotation-invariant and enlargement/reduction-invariant. This enables a search even when the image is rotated or enlarged/reduced. The local feature amount is generally expressed as a vector. Theory holds that the local feature amounts are rotation-invariant and enlargement/reduction-invariant. In an actual digital image, however, a little change occurs between a local feature amount before rotation or enlargement/reduction processing of the image and a corresponding local feature amount after processing.

In, for example, non-patent literature 2, to extract a local feature amount that is rotation-invariant, a main direction is calculated from the pixel pattern of a local region around the local feature point. When calculating the local feature amount, the local region is rotated based on the main direction, thereby normalizing the direction. To calculate a local feature amount that is enlargement/reduction-invariant, images of different scales are internally generated. Local feature point extraction and local feature amount calculation are performed for each of the images of the scales. In general, the set of a series of internally generated images of different scales is called a scale space.

With the above-described method, a plurality of local feature points are extracted from one image. In an image search using local feature amounts, local feature amounts calculated from the local feature points are compared to do matching. In a voting method (patent literature 1) often used, a feature point similar to a predetermined level or more to the local feature amount of each feature point extracted from a search source image is found by the nearest-neighbor algorithm. If such a feature point exists, one vote is cast to the "image". The larger the number of votes is, the similar the image is.

In the image search, to efficiently perform matching, image indices are created. In the image indices, local feature amounts are quantized, and a list of images having the feature amount of a certain quantization value is associated with the quantization value and stored in a database. When the image indices are used, a list of images including local feature amounts similar to a certain local feature amount to some extent can quickly be obtained.

In patent literature 2, there is proposed a technique concerning a system that accumulates the contents of a job output from a printing apparatus or the like and allows the job to be tracked. A printed document image, who has printed it, the date/time of printing, and the like are accumulated. When image information of a design or the like has leaked out, the printed document image is searched using the leaked image.

However, several hundreds to several thousands of local feature amounts are extracted from an image. For this reason, when an "image identical to" an image already registered in an image index is registered in an image index again, several hundreds to several thousands of redundant indices are generated. Similarly, when an "image included in" an image already registered in an image index is registered in an image index, redundant indices are generated.

This problem is conspicuous particularly when, for example, a printed document image as in patent literature 2 is to be searched. In, for example, an office, the same document is often printed many times. For this reason, if the above method is applied to such a system, the image indices problematically bloat.

When the indices bloat, the size of indices becomes large. When the indices are redundant, many indices are scanned at the time of a search, and the search speed lowers.

To speed up the search, the indices are often held on a memory. However, if the size of indices is large, arranging them on the physical memory of a computer may be impossible. In this case, the indices are arranged on a virtual memory on an HDD by the function of the OS. Since the speed of referring to the image indices arranged on the HDD is low, the search speed lowers. To avoid this, a physical memory having a large capacity may be prepared. However, this makes the system expensive.

A REFERENCE LIST

Patent literature 1 to JPA 2009-284084.
Patent literature 2 to JP Pat. No. 4,921,202.
Non-patent literature 1 to C. Harris and M. J. Stephens, "A combined corner and edge detector," In Alvey Vision Conference, pages 147-152, 1988.
Non-patent literature 2 to David G. Lowe, "Distinctive Image Features from Scale-Invariant Keypoints," International Journal of Computer Vision, 60, 2 (2004).
Non-patent literature 3 to M. A. Fischler and R. C. Bolles, "Random sample consensus: A paradigm for model fitting with applications to image analysis and automated cartography" Commun. ACM, No. 24, vol. 6, pp. 381-395, June 1981.
Non-patent literature 4 to J. J. Koenderink and A. J. van Doorn, "Representation of local geometry in the visual system," Riological Cybernetics, vol. 55, pp. 367-375, 1987.

SUMMARY OF THE INVENTION

The present invention has been made in consideration of the above-described problems. This specification provides a technique of suppressing bloating of image indices used for a search. This specification also provides a method of prohibiting local feature amounts extracted from the same image from redundantly being registered and enabling a search for the image.

According to an aspect of the present invention, there is provided an image register apparatus comprising: a first holding unit configured to hold, in association with each other, local feature amounts of an image and information that specifies the image including the local feature amounts; a second holding unit configured to hold, in association with each other, information that specifies a registered image whose local feature amounts are held by the first holding unit and information that specifies a similar image similar to a partial region of the registered image; a searching unit configured to search registered images for an image partially similar to an input target image to be registered; and a register unit configured to, when a search result image obtained by the search of the searching unit includes the target image to be registered, exclude the target image to be registered from a holding target of the first holding unit, and register, in association with each other, information that specifies the search result image in the second holding unit and information that specifies the target image to be registered.

According to the present invention, when a target image to be registered is given, and the target image to be registered is included in an image already registered in an image index, the target image to be registered is stored and managed as an image linked to the image registered as the index image. This makes it possible to suppress bloating of the indices and also suppress lowering of the search speed.

According to the present invention, it is possible to prohibit local feature amounts extracted from the same image from redundantly being registered and enable a search for the image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a flowchart of partial image search processing according to the embodiment;

FIG. 9 is a flowchart of content registration processing according to the embodiment;

FIG. 13 is a flowchart showing an example of image feature amount extraction processing according to the third embodiment;

FIG. 14 is a flowchart showing an example of an image registration processing procedure according to the third embodiment;

FIGS. 15A and 15B are views showing examples of schemas when registering image feature amounts in a database according to the third embodiment;

FIG. 17 is a view showing an example of a database table after link information registration according to the third embodiment;

FIG. 19 is a table showing an example of information about allocation images according to the third embodiment;

FIGS. 22A and 22B are views showing an example of a database table after image division/re-registration according to the third embodiment;

FIG. 29 is a view showing an example of a region segmentation result according to the fourth embodiment;

FIG. 31 is a flowchart showing a registration processing procedure according to the fifth embodiment; and FIG. 32 is a flowchart showing an image registration processing procedure according to the fifth embodiment.

DESCRIPTION OF THE EMBODIMENTS

The embodiments of the present invention will now be described in detail with reference to the accompanying drawings.

First Embodiment

The arrangement of a computer apparatus that constructs a server apparatus or client apparatus according to this embodiment will be described with reference to the block diagram of FIG. 1. The server apparatus or client apparatus can be implemented by a single computer apparatus or by distributing functions to a plurality of computer apparatuses as needed. If the server apparatus or client apparatus is implemented by a plurality of computer apparatuses, the computer apparatuses are connected by a LAN (Local Area Network) or the like so as to be communicable with each other. The computer apparatus can be implemented by an information processing apparatus such as a personal computer (PC) or work station (WS).

Figure 1:
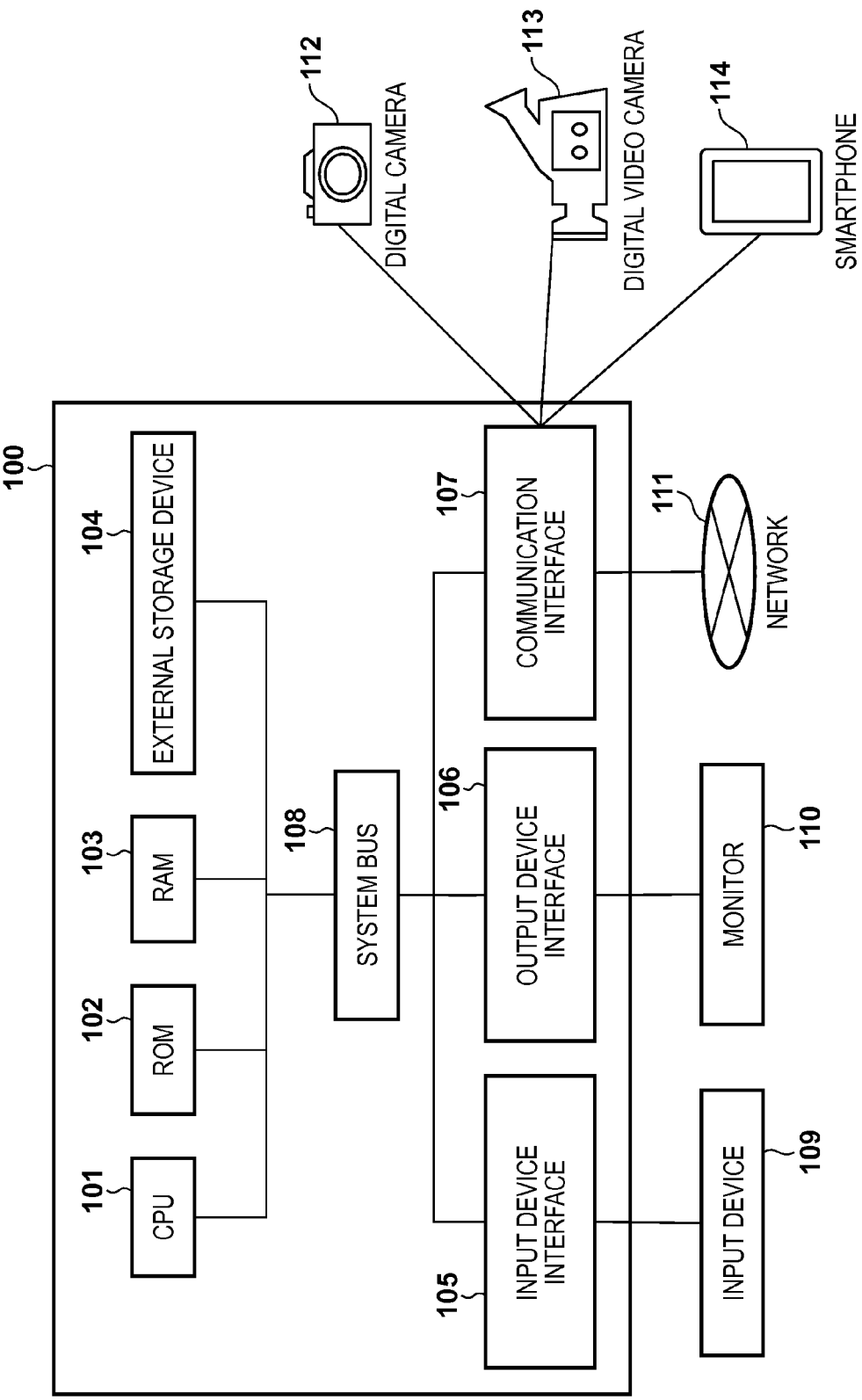
FIG. 1 is a block diagram showing the arrangement of a computer apparatus to which an embodiment is applied.

Referring to FIG. 1, a CPU 101 is a central processing unit that controls an entire computer apparatus 100. A ROM 102 is a read only memory configured to store programs and parameters that need not be changed. A RAM 103 is a random access memory configured to temporarily store programs and data supplied from an external apparatus or the like. An external storage device 104 is a storage device such as a hard disk stationarily arranged in the computer apparatus 100 or a memory card, and is used to accumulate image files. Note that the external storage device 104 may include a flexible disk (FD) detachable from the computer apparatus 100, an optical disk such as a compact disk (CD), a magnetic or optical card, an IC card, and a memory card. An input device interface 105 is an interface to an input device 109 such as a pointing device or a keyboard, which receives a user operation and inputs data. An output device interface 106 is an interface to a monitor 110 configured to display supplied data or data held by the computer apparatus 100. A communication interface 107 is used to connect a network 111 such as the Internet, a digital camera 112, a digital video camera 113, a smartphone 114, and the like. A system bus 108 is a transmission line that communicably connects the above units 101 to 107.

Each operation to be described later is executed by causing the CPU 101 to execute a program stored in a computer-readable storage medium such as the ROM 102.

[Arrangement of Image Search Apparatus]

In this embodiment, an example of application to an image search apparatus will be described. When newly registering an image included in an already registered image, the image search apparatus according to this embodiment does not add the target image to be registered to image indices. Instead, link information from the already registered image is generated and held.

Figure 2:
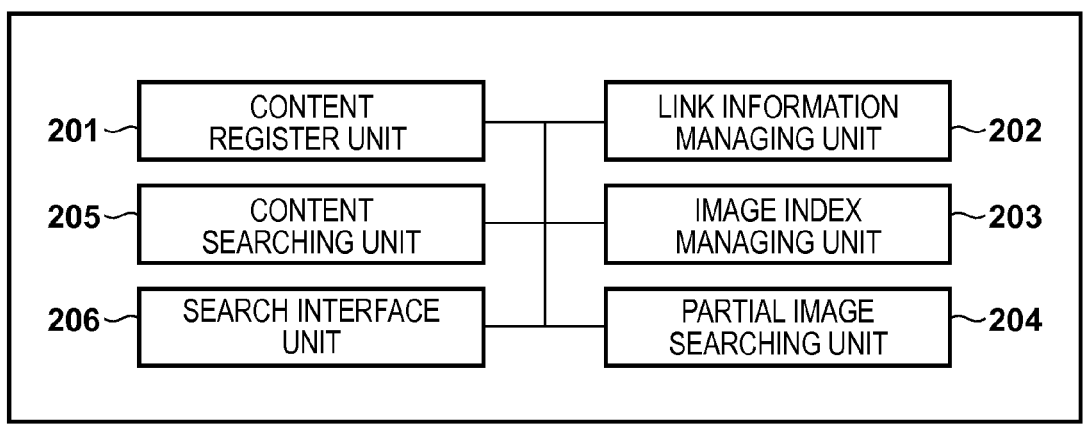
FIG. 2 is a block diagram showing the arrangement of an image search apparatus according to the embodiment.

The arrangement of the image search apparatus according to this embodiment will be described below with reference to FIG. 2. FIG. 2 is a functional block diagram when the CPU 101 executes a program stored in the ROM 102.

A content register unit 201 performs processing of registering an image to be searched. More specifically, when registering an image included in an already registered image, link information from the already registered image is generated and stored in a link information managing unit 202. On the other hand, if the image including the target image to be registered is not registered, the image feature amounts of the target image to be registered are stored in an image index managing unit 203. Detailed content registration processing will be described later with reference to the flowchart of FIG. 4.

The link information managing unit 202 holds and manages, as link information, information of an image serving as a reference (reference content) and information of an image included in the reference content.

Figures 3A, 3B, 3C:
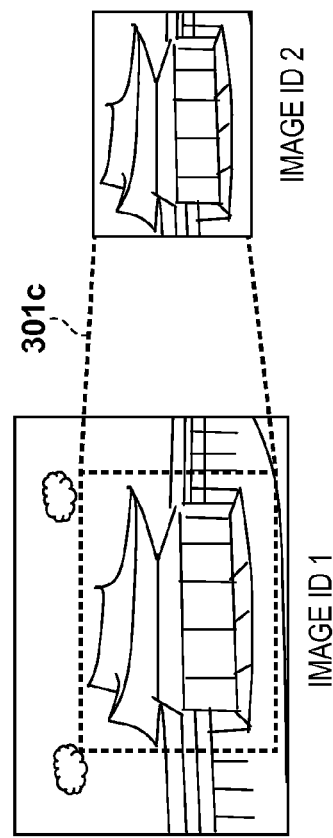
FIGS. 3A to 3C are explanatory views of link information and image indices according to the embodiment.

For example, when the reference content is image ID 1 shown in FIG. 3C, inclusion of image ID 2 in a broken line region 301c of image ID 1 is held as link information.

More specifically, a reference content ID, number of links, link image list, region information, and number of feature amounts are held, as shown in FIG. 3A. Note that this one row will be referred to as a record hereinafter. The first record shown in FIG. 3A indicates the link information shown in FIG. 3C.

The reference content ID is an ID generated every time a reference content is determined. Hence, the reference content ID "A" is the ID generated when image ID 1 is determined as the reference content. Note that the ID uses an alphabetic character for easy discrimination from image IDs. However, a numerical value or the like may be used.

The link image list is a list of image IDs included in the reference content. The first image in the link image list is the reference content itself, and subsequent images are images included in the first image (that is, linked images). In this example, the link image list indicates that image ID 1 includes image ID 2.

The region information is the coordinate information of a rectangular region representing the correspondence between the link image and the region of the reference content. The sequence of the region information corresponds to the sequence of the link image list. For example, the first region information is information representing the corresponding region of image ID 1. However, since image ID 1 is the reference content itself, the region information represents the whole region of image ID 1. Hence, the whole region of image ID 1 is described as region information. The next region information represents the region of image ID 1 corresponding to image ID 2, and has the coordinates of the upper left and lower right corners of the broken line region 301c of image ID 1 shown in FIG. 3C. Note that this embodiment uses a coordinate system that has the origin at the upper left corner of the image and sets the x-axis rightward and the y-axis downward. Because of the rectangular region, the region information is expressed by the set of coordinates of the upper left and lower right corners of the rectangle. However, the region information may be expressed by the coordinates of the upper left corner, the horizontal size (number of pixels), and the vertical size (number of pixels). The region information need only describe the corresponding region and need not always indicate a rectangular region. For example, a polygonal region formed from a plurality of coordinate values may be used. Alternatively, a circular region described by a center and a radius may be used. The present invention is not limited to expressing region information.

The number of feature amounts is the number of local feature amounts matching between the reference content and the link image. The sequence of the number of feature amounts corresponds to the sequence of the link image list. For example, the first number of feature amounts is the number of local feature amounts matching between the reference content and image ID 1, that is, the number of local feature amounts of image ID 1. The second number of feature amounts is the number of local feature amounts matching between the reference content (image ID 1) and image ID 2. Here, the number of local feature amounts is recorded as 500. The number of feature amounts may be the number of local feature amounts that match between the reference content and the link image and fall within the range of the region information. Alternatively, the number of local feature amounts of the link image may simply be used.

Note that the region information and the number of feature amounts are used to calculate the similarity between search results to be described later. Hence, when information is not used to calculate the similarity, the information that is not used may be absent. Alternatively, if similarity calculation is unnecessary, these pieces of information may be absent.

The pieces of information held by the link information managing unit 202 may be held and managed in another configuration. For example, in the above configuration, pieces of information of a plurality of link images are associated with one reference content ID. This record may be divided into a plurality of records so that information of one link image is associated with one reference content ID.

In the above configuration, a plurality of pieces of information are held in one table structure. However, the pieces of information may be divisionally managed in a table for reference content information and a table for link information. For example, the table for reference content is formed from a reference content ID, the image ID of the reference content, the region information of the image, and the like. On the other hand, the table for link information is formed from a reference content ID, image IDs linked to the reference content, the region information of the images, and the like. The configuration of information held by the link information managing unit 202 according to the present invention is not limited to these. In short, it is only necessary to store and manage information representing which link image corresponds to which reference content image, and to which region of the reference content image each link image corresponds.

The image index managing unit 203 manages local feature amounts extracted from an image and a reference content ID including the local feature amounts. The image index managing unit 203 also manages the coordinates of the local feature amounts on the reference content.

The local feature amounts of an image are obtained by extracting feature points (local feature points) of the image and calculating feature amounts (local feature amounts) corresponding to the feature points based on the feature points and image information on the periphery. Detailed "local feature amount extraction processing" will be described later with reference to the flowchart of FIG. 6A.

Figure 7A:
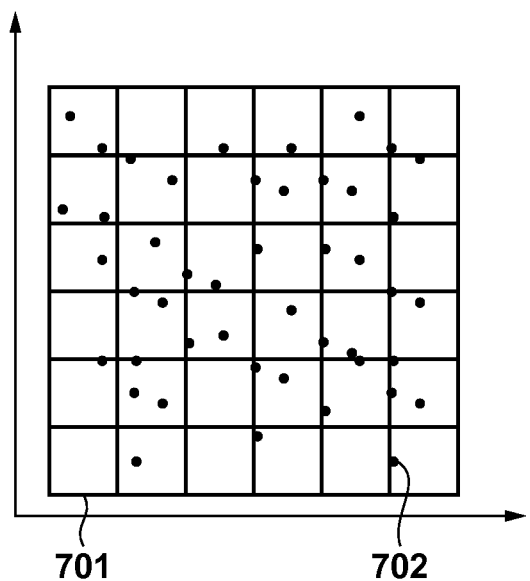
FIGS. 7A and 7B are explanatory views of a quantization space according to the embodiment.

The local feature amounts are quantized so as to be used as image indices. For example, when a local feature amount is a two-dimensional vector, the feature amount space is divided into a lattice or the like, as shown in FIG. 7A. The same quantization value is assigned to local feature amounts belonging to the same lattice region. In fact, since a local feature amount is an N-dimensional vector, processing expanded to an N-dimensional space is applied. Detailed "local feature amount quantization processing" will be described later.

The image index managing unit 203 holds a quantization value to which an "image ID group including the local feature amount" and the "information of the local feature amount" are assigned. More specifically, an image index is formed from a quantization value, and a list of {reference content ID, x-coordinate, y-coordinate}, as shown in FIG. 3B. The quantization value is the quantization value of a local feature amount. The list of {reference content ID, x-coordinate, y-coordinate} includes the ID of a reference content including the local feature amount and the position coordinates of the local feature amount on the reference content.

Note that the image index managing unit 203 may hold the information in another configuration. For example, in the above configuration, pieces of information of a plurality of reference contents are associated with one quantization value. However, they may be associated in a one-to-one correspondence. The configuration of the image index according to the present invention is not limited to these.

A partial image searching unit 204 searches the image index managing unit 203 for a reference content partially matching a query image. More specifically, local feature amounts are extracted and quantized from a query image. A reference content ID having the same quantization values as in the query image is thus obtained. The number of times of inclusion is counted for each reference content ID as a similarity. A search result is created by sorting in the order of similarity. Detained partial image search processing will be described later with reference to the flowchart of FIG. 8.

Based on the query image, a content searching unit 205 searches for an image registered by the content register unit 201. More specifically, the partial image searching unit 204 obtains a reference content using the query image. The reference content is obtained from the link information managing unit 202 using the reference content. A similarity is determined for the obtained image ID group, and a search result is created by sorting in the order of similarity. Detailed content search processing will be described later with reference to the flowchart of FIG. 5A.

A search interface unit 206 is an interface portion that receives a target image to be registered in the content register unit 201, or receives a query image and outputs a search result. More specifically, the file path of an image stored in the external storage device 104 or the like is designated as a registered image or a query image using the input device 109, thereby accepting an input. The search interface unit 206 stores the corresponding relationship between an image ID and the file path of the registered image. When displaying a search result, a file path list is displayed on the monitor 110 based on the search result generated by the content searching unit 205. Alternatively, the thumbnail of each image may be read out from the file path and displayed. The input/output form according to the present invention is not limited to these.

Note that the registered image or query image may be input from the network 111, including the digital camera 112, the digital video camera 113, and the smartphone 114 having an image capturing function, via the communication interface 107, as shown in FIG. 1.

[Content Registration Processing]

Content registration processing will be described next with reference to the flowchart of FIG. 4. This processing is executed by the content register unit 201. When executing this processing, the search interface unit 206 gives a target image to be registered. Registration in the link information managing unit 202 or the image index managing unit 203 is controlled based on the presence/absence or inclusion relationship of an existing reference content. Details of control will be described with reference to FIG. 4.

In step S401, the content register unit 201 searches for reference contents by a partial image search using the target image to be registered as a query. More specifically, the content register unit 201 controls the partial image searching unit 204. As a result, the partial image searching unit 204 extracts local feature amounts from the target image to be registered and searches the image index managing unit 203 based on the local feature amounts. Detailed partial image search processing (FIG. 8) will be described later. A list in which reference content IDs partially matching the target image to be registered are sorted in the order of similarity is thus acquired.

In step S402, the content register unit 201 determines whether a corresponding reference content exists. More specifically, the content register unit 201 determines whether a reference content ID having a similarity more than a predetermined threshold value exists in the list of reference content IDs acquired in step S401. Upon determining that no reference content exists (NO), the process advances to step S403. Otherwise (YES), the process advances to step S405.

In step S403, the content register unit 201 registers the target image to be registered in the link information managing unit 202 as a new reference content. More specifically, the content register unit 201 first generates a new reference content ID. For example, the reference content ID generated latest is stored, and a value obtained by incrementing it is obtained as the new reference content ID. Note that since the ID is a character in this embodiment, a unique ID may be generated by incrementing the character code value or by other methods. Next, the image ID of the target image to be registered is set in the link image list. The content register unit 201 sets "1" as the initial value of the number of links. The content register unit 201 sets, as region information, rectangular region coordinates corresponding to the size of the target image to be registered. The content register unit 201 sets the number of local feature amounts extracted from the target image to be registered as the number of feature amounts. The content register unit 201 then registers a record having these pieces of information in the link information managing unit 202.

In step S404, the content register unit 201 registers the local image feature amounts of the target image to be registered in image indices. More specifically, the content register unit 201 adds the quantized local feature amounts of the target image to be registered and the reference content ID and the coordinates of the local feature amounts generated in step S403 to the image index managing unit 203. If there is no corresponding quantized local feature amount, a record is newly generated and registered.

Upon determining in step S402 that the reference content corresponding to the target image to be registered is already registered, the process advances to step S405. In step S405, the content register unit 201 obtains the inclusion relationship between the target image to be registered and the reference content obtained in step S402. Here, RANSAC (non-patent literature 3) is used. RANSAC is a method in which the correspondence of local feature amounts between a comparison source image and a comparison destination image is obtained, and an affine transformation matrix used to do transformation to make the coordinates of the local feature amounts match is obtained.

Using the target image to be registered as the comparison source image and the reference content as the comparison destination image, an affine transformation matrix is obtained by RANSAC. The coordinates of the four corners of the target image to be registered are transformed using the affine transformation matrix. When the resultant coordinates of the four corners are located inside the coordinates of the four corners of the reference content, the inclusion relationship is decided as "the reference content includes the target image to be registered". The coordinates of the four corners of the reference content can easily be obtained from region information in the link information managing unit. On the other hand, when the coordinates of the four corners of the reference content are located inside the coordinates of the four corners of the target image to be registered obtained by the transformation, the inclusion relationship is decided as "the target image to be registered includes the reference content". Otherwise, the inclusion relationship is decided as "no inclusion relationship exists". In an otherwise case, for example, if the target image to be registered and the reference content partially overlap, it is determined that no inclusion relationship exists.

Not the coordinates of the four corners of the image but the coordinates of the four corners of the outermost circumscribed rectangle of the local feature amounts extracted from the image may be used. This is because a portion having no local feature amounts does not affect the search result, and therefore, even the outermost circumscribed rectangle of the local feature amounts suffices.

Note that although RANSAC is used to obtain the inclusion relationship between the images, any other method may be used, and the present invention is not limited by the type of the method.

In step S406, the content register unit 201 determines whether the reference content includes the target image to be registered. This determination is done based on the inclusion relationship obtained in step S405. If the reference content includes the target image to be registered (YES), the process advances to step S407. Otherwise (NO), the process advances to step S403.

In step S407, the content register unit 201 excludes the target image to be registered from the management target of the image index managing unit 203, and instead, adds the target image to be registered to the link of the existing reference content. More specifically, the content register unit 201 specifies a record having a matching reference content ID in the link information managing unit 202. The number of links is incremented by "1". Next, the image ID of the target image to be registered is added to the end of the link image list. The content register unit 201 obtains a circumscribed rectangular region using the transformed coordinates of the four corners of the target image to be registered obtained in step S405, and adds the coordinates to the end of the region information. Finally, the content register unit 201 adds the number of local feature amounts matching between the reference content and the target image to be registered to the end of the number of feature amounts. Note that in this embodiment, since the number of matching local feature amount equals the similarity obtained in step S401, the similarity may be used.

In step S408, the content register unit 201 registers the difference feature amounts of the target image to be registered in image indices. More specifically, the content register unit 201 extracts and quantizes local feature amounts from the target image to be registered. Next, a list of {reference content ID, x-coordinate, y-coordinate} corresponding to each extracted quantization value is specified in the image index managing unit 203. If the reference content ID having the inclusion relationship does not exist in the list, the reference content ID and the coordinates of local feature amounts on the reference content are added to the image index managing unit 203. Alternatively, even if the reference content ID having the inclusion relationship exists in the list, different coordinates may be registered. If the quantization value itself does not exist, similar information is generated, and a record is added. Note that the position coordinates of the local feature amounts extracted from the target image to be registered are different from those on the reference content. For this reason, position coordinates transformed using the affine transformation matrix obtained in step S405 are used in registration.

Note that the process of step S408 need not always be performed. If the process is not performed, the difference local feature amounts of the target image to be registered are not registered. However, since the local feature amounts of the original reference content are registered, content search processing can be performed. In addition, since content registration processing is simplified, the registration speed is improved. However, there is a possibility that more local feature amounts are obtained from the target image to be registered than the reference content. This is because reduced images called a scale space are created, and local feature amounts are extracted from the reduced images. That is, since the target image to be registered is smaller than the reference content, reduced images of a reduction ratio higher than that of the reduced images of the reference content are also created. For this reason, local feature amounts are extracted from the reduced images that are not created from the reference content. Hence, there is a possibility that more local feature amounts are obtained from the target image to be registered. Especially, when the size of the target image to be registered is larger than the partial region of the reference content, the resolution of the target image to be registered is higher than that of the partial region of the reference content. In this case, it can therefore be expected to particularly obtain more difference local feature amounts. When such difference local feature amounts are registered, the accuracy of the search result can be expected to improve.

In a case where the process of step S408 is not performed, if the target image to be registered is extremely smaller than the reference content, it may be registered in the image indices without using link information. More specifically, even if the reference content includes the target image to be registered in step S406, if the target image to be registered is extremely smaller than the reference content, the process advances to step S403. This can prevent the image feature amounts of the target image to be registered from being extremely lost. It can therefore be expected to prevent the search accuracy from lowering.

In step S405, out of the reference contents obtained in step S402, only one reference content having the highest similarity is used. However, an inclusion relationship may be obtained for each of reference contents whose similarities are equal to or more than the predetermined threshold value in descending order of similarity, and when a reference content having an inclusion relationship is found, the inclusion relationship and the reference content may be used from step S406. This makes it possible to find a reference content having an inclusion relationship even when the similarity of the reference content having the inclusion relationship is relatively low.

In an image search apparatus of another embodiment, the processing of registering the target image to be registered as a reference content and the processing of registering the target image to be registered as a link from a reference content may divisionally be executed. More specifically, steps S403 and S404 are executed in the former processing. On the other hand, processes other than steps S403 and S404 are executed in the latter processing. In the latter processing, the processing ends if NO in step S402 or S406.

As described above, the embodiment in which the reference contents are registered in advance is effective when the reference contents can be prepared in advance.

For example, examine a system that registers printed document images and searches for a print including a specific design later. At this time, before operating the system, a fine design image is prepared and registered in advance as a reference content using the former processing. When the system is operated, a document image that partially or wholly prints a design image can be registered as a link from the reference content using the latter processing.

Note that the printed document may also include a text and the like other than the design image. For this reason, it is probably more effective to specify the image region of the document and register only that portion.

As described above, the processing may be divided into the phase of registering the reference contents and the phase of registering only links from the reference contents. The processes may be executed by a single apparatus or by separate apparatuses.

[Content Search Processing]

Figure 5A:
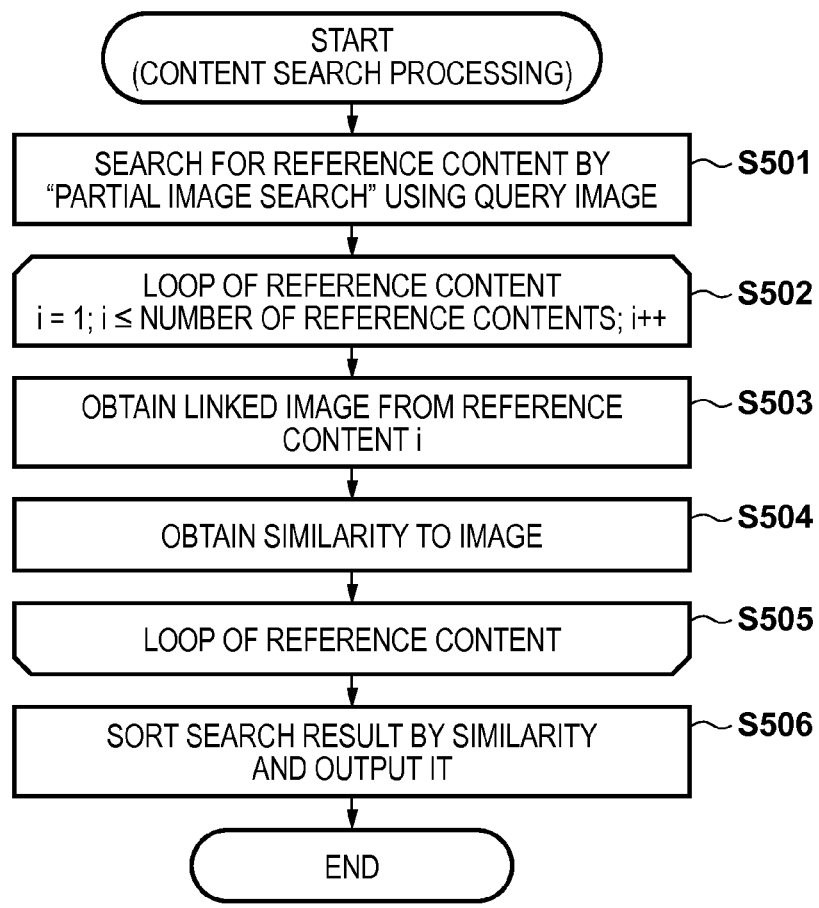
FIGS. 5A and 5B are explanatory views of content search processing according to the embodiment.

Content search processing will be described next with reference to the flowchart of FIG. 5A. This processing is executed by the content searching unit 205. When executing this processing, the search interface unit 206 gives a query image. A reference content is searched based on the query image, and a link image linked to the reference content is acquired. The similarity of the obtained image is obtained, and a search result is created. The search result is output from the search interface unit 206 to the monitor 110 or the like.

First, in step S501, the content searching unit 205 requests the partial image searching unit 204 to search for reference contents using the query image. As a result, the partial image searching unit 204 extracts local feature amounts from the query image and searches for the image index managing unit 203 based on the local feature amounts. Detailed partial image search processing (FIG. 8) will be described later. A list in which reference content IDs partially matching the query image are sorted in the order of similarity is thus acquired.

Steps S502 and S505 form a loop for the list of reference content IDs obtained in step S501. The reference content IDs in the list are assigned numbers sequentially from 1. The reference content IDs are referred to by using a variable i. First, i is initialized to 1. If i is equal to or smaller than the number of reference content IDs, the process advances to step S503. If this condition is not met, the process exits from the loop and advances to step S506.

In step S503, the content searching unit 205 obtains an image linked from the ith reference content. More specifically, the link information managing unit 202 is searched using the ID of the ith reference image content as a key, thereby obtaining the link image list of each reference content ID.

In step S504, the content searching unit 205 calculates the similarity between the query image and each image of the link image list acquired in step S503. More specifically, the area of the overlap region between the query image and the image to be calculated is obtained, and the area is divided by the area of the query image, thereby obtaining the similarity.

Figure 5B:
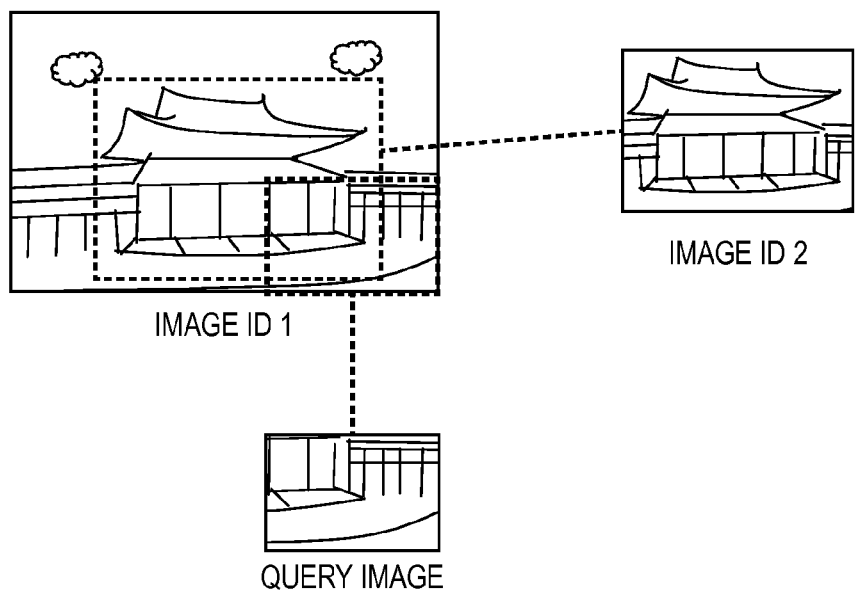

For example, assume that image ID 1 as a reference content and image ID 2 as a link image are searched for based on a query image, as shown in FIG. 5B. Note that the broken lines indicate which portions of image ID 1 the image ID 2 and the query image correspond to. At this time, since the overlap area between image ID 1 and the query image is the same as the area of the query image, the similarity is 1. On the other hand, since image ID 2 covers only about 60% of the query image, the similarity is calculated as, for example, 0.6. That is, the similarity is obtained by "overlap area÷area of query image".

A partial region of the reference content, to which the query image corresponds, is obtained using RANSAC already described. More specifically, using the query image as the comparison source image and the reference content as the comparison destination image, an affine transformation matrix is obtained using RANSAC. The coordinates of the four corners of the query image are transformed into coordinates on the reference content using the affine transformation matrix. The coordinates of a rectangle as indicated by the thick broken line are thus obtained. Note that rotation or the like may slightly occur by affine transformation. In this case, to easily obtain the overlap area, the outermost circumscribed rectangle of the coordinates after the affine transformation may be used.

On the other hand, the region information of the reference content and the region information of the image linked from the reference content are managed in the link information managing unit 202 and can therefore be obtained by referring to it. Since the pieces of region information are obtained, the similarity can be calculated.

In step S505 that is the termination of the reference content searching loop, the content searching unit 205 increments i by one and returns to step S502. By repeating steps S503 to S505, all images linked to the reference content found in step S501 are obtained, and the similarity of each image is decided. In step S506, the content searching unit 205 sorts the images in descending order based on the similarities and outputs a search result. At this time, images whose similarities are equal to or less than a predetermined threshold value may be excluded from the search result.

Note that in step S504, the coverage of the query image is used as a similarity. However, a value obtained by multiplying the coverage by "number of matching feature amounts" may be used. This makes it possible to obtain the pseudo number of feature amounts included in a link image out of the feature amounts included in the query image. Hence, a similarity like a similarity in partial image search processing can be obtained by calculation. This may be used as a similarity.

Alternatively, the number of "matching feature amounts" included in the matching region of the query image is counted. The strict number of matching feature amounts can be obtained, although the pseudo number of feature amounts is obtained by the above-described method.

Otherwise, the similarity may be calculated based on only the number of feature amounts without using the area. For example, the pseudo coverage of the number of feature amounts is obtained. More specifically, the link information managing unit stores the number of feature amounts matching between an image and a reference content. Using this fact, a similarity may be obtained by "number of feature amounts matching between the query image and the reference content×number of feature amounts matching between the image and the reference content number of feature amounts of reference content". Since this method does not use the area, RANSAC and the like are unnecessary. For this reason, the speed can be expected to improve.

Alternatively, the similarity may be decided simply in the order in the link image list. For example, the images are sorted using the similarity in the partial image search as the first sort key and the order in the link image list as the second sort key. In accordance with the sort result, 1 is assigned to the image of the lowest rank. Integers are assigned while incrementing the number toward the top, and the numbers may be used as similarities. In this method, since the region information and the number of feature amounts are unnecessary, the link information can be reduced. In addition, since calculation processing to obtain these pieces of information is unnecessary at the time of registration, the registration processing can be expected to speed up.

Examples of "local feature amount extraction processing", "local feature amount quantization processing", and "partial image search processing" used in this embodiment will be described below.

[Local Feature Amount Extraction Processing]

Figure 6A:
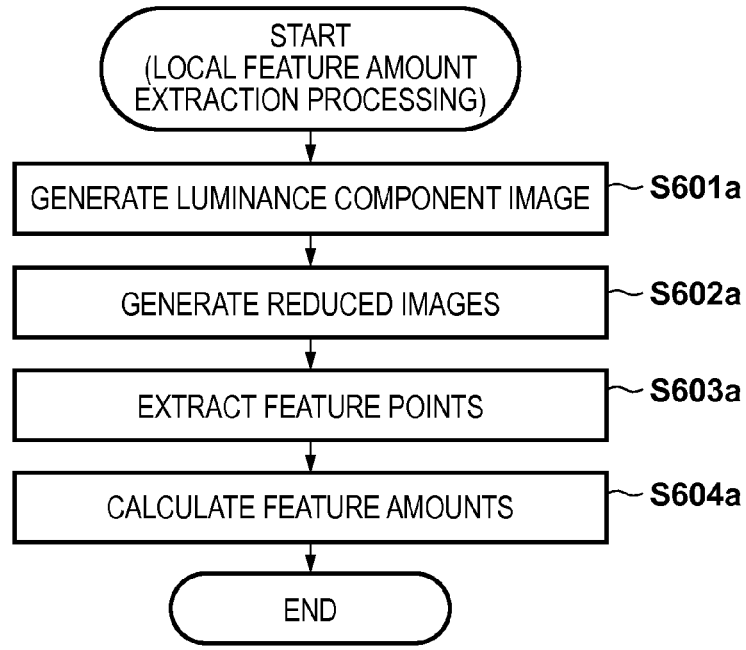
FIGS. 6A and 6B are explanatory views of local feature amount extraction processing according to the embodiment.

An example of a method of extracting local feature amounts from an image will be explained with reference to FIG. 6A.

In step S601a, luminance components are extracted from an input image. As a result, a luminance component image (monochrome image) based on the luminance components is generated.

In step S602a, the luminance component image is sequentially repetitively reduced in accordance with a magnification (reduction ratio) p, thereby generating n reduced images including the original image, which are reduced stepwise from the image of the original size. The magnification p and the number n of reduced images are determined in advance.

Figure 6B:
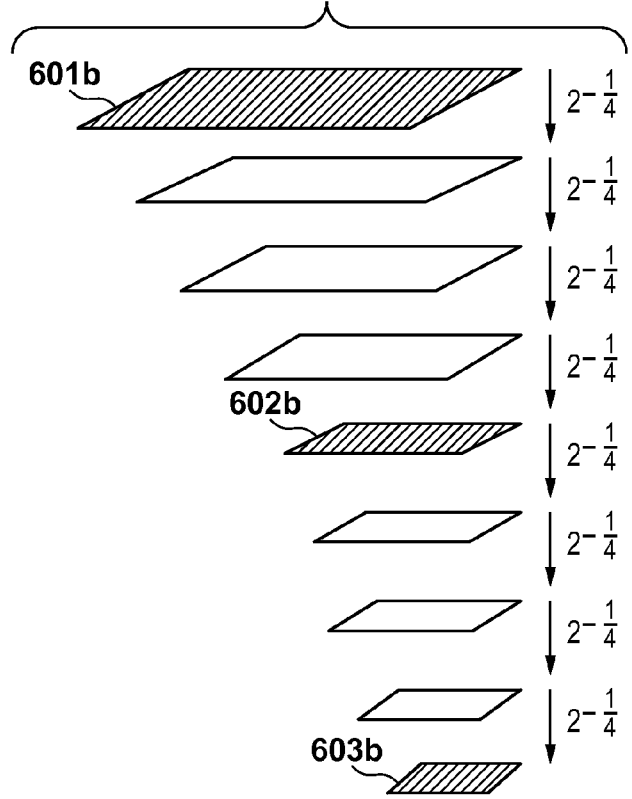

FIG. 6B is a view showing an example of reduced image generation processing. In the example shown in FIG. 6B, the magnification p is "2 to the power of one-quarter", and the number n of reduced images is "9". The magnification p need not always be "2 to the power of one-quarter", as a matter of course. Referring to FIG. 6B, reference numeral 601b denotes a luminance component image generated in step S601a; 602b, a reduced image obtained by performing reduction processing from the luminance component image 601b recursively four times in accordance with the magnification p; and 603b, a reduced image obtained by performing reduction from the luminance component image 601b eight times in accordance with the magnification p.

In this example, the reduced image 602b is an image obtained by reducing the luminance component image 601b to ½ in both the horizontal and vertical directions. The reduced image 603b is an image obtained by reducing the luminance component image 601b to ¼ in both the horizontal and vertical directions. Note that any method of reducing an image is usable. In this embodiment, a reduced image is generated by a reduction method using linear interpolation.

In step S603a, local feature points capable of being robustly extracted even when the n reduced images rotate are extracted. In this embodiment, a Harris operator is used as the method of extracting the local feature points (see non-patent literature 1).

More specifically, for the pixels of an output image H obtained by causing the Harris operator to act, the pixel values of a pixel of interest and eight pixels in the neighborhood of the pixel of interest (a total of nine pixels) are checked. A point where the pixel of interest is the local maximum (the pixel value of the pixel of interest out of the nine pixels is maximized) is extracted as a local feature point. Even when the pixel of interest is the local maximum, if the value of the pixel of interest is equal to or less than a threshold value, the point is not extracted as a local feature point.

Note that any feature point extraction method other than the feature point extraction method by the Harris operator is usable if a local feature point can be extracted.

In step S604a, a feature amount (local feature amount) defined to be invariant even in case of rotation of the image is calculated for each of the local feature points extracted in step S603a. In this embodiment, a combination of Local Jets and derivatives thereof is used as the local feature point calculation method (see non-patent literature 4).

More specifically, a local feature amount V is calculated by $$V = \begin{pmatrix} L \\ L_x L_x + L_y L_y \\ L_{xx} L_x L_x + 2 L_{xy} L_x L_y + L_{yy} L_y L_y \\ L_{xx} + L_{yy} \\ L_{xx} L_{xx} + 2 L_{xy} L_{xy} + L_{yy} L_{yy} \end{pmatrix} \quad (1)$$

The symbols used on the right-hand side of equation (1) are defined by equations (2) to (7) below.

$$L = G(x, y) * I(x, y) \quad (2)$$

-continued $$L_x = \frac{\partial L}{\partial x} \quad (3)$$

$$L_y = \frac{\partial L}{\partial y} \quad (4)$$

$$L_{xy} = \frac{\partial^2 L}{\partial x \partial y} \quad (5)$$

$$L_{xx} = \frac{\partial^2 L}{\partial x^2} \quad (6)$$

$$L_{yy} = \frac{\partial^2 L}{\partial y^2} \quad (7)$$

G(x, y) on the right-hand side of equation (2) is a Gaussian function, I(x, y) is the pixel value on coordinates (x, y) of the image, and "*" is a symbol representing convolution. Equation (3) is a partial derivative concerning x of a variable L defined by equation (2), and equation (4) is a partial derivative concerning y of the variable L. Equation (5) is a partial derivative concerning y of a variable Lx defined by equation (3), equation (6) is a partial derivative concerning x of the variable Lx defined by equation (3), and equation (7) is a partial derivative concerning y of a variable Ly defined by equation (4).

Note that any feature amount calculation method other than the above-described feature amount calculation method is usable if a local feature amount can be calculated.

Local feature amounts can thus be extracted from the target image.

[Local Feature Amount Quantization Processing]

To facilitate matching between local feature amounts, the above-described local feature amounts are quantized.

For example, a local feature amount is defined as an N-dimensional vector V, and each dimension is represented by as $V_n$. At this time, letting N and $K_n$ be values determined in advance, quantization in $K_n$ tones can be done for the feature amount of the nth dimension by a value $Q_n$ obtained by quantizing a feature amount $V_n$ of the nth dimension out of the N dimensions $$Q_n = (V_n * K_n)(V_{n\_max} - V_{n\_min} + 1) \quad (8)$$

where $V_{n\_max}$ and $V_{n\_min}$ are the maximum value and the minimum value, respectively, that the feature amount of the nth dimension can take.

Figure 7B:
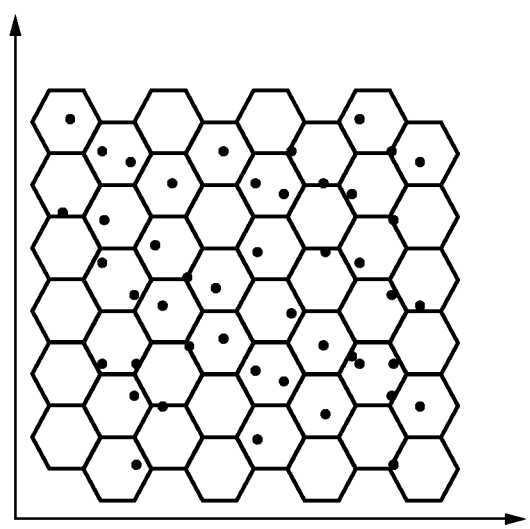

Note that in the above quantization, the number of quantized tones is determined for each dimension. However, the number of tones common to all dimensions may be used. This quantization method means a method of dividing the feature amount space into a lattice as shown in FIG. 7A. However, the feature amount space may be divided into a lattice as shown in FIG. 7B. In FIG. 7A, reference numeral 701 denotes a quantization region in the feature amount space; and 702, a feature. Both FIGS. 7A and 7B show examples in which a two-dimensional feature amount space is divided and quantized. The feature amount space is extended to a multidimensional space corresponding to the number of dimensions of local feature points and then divided.

Any division method other than the quantization method based on the above-described rule is applicable if the feature amount space can be divided. For example, a clustering rule may be created by mechanically learning a plurality of images, and the feature amount space may be divided and quantized based on the rule.

After quantization for each dimension, the quantization values may be labeled by equation (9) so as to be substantially handled like one-dimensional feature amounts.

$$IDX = Q_1 + Q_2 * K_1 + Q_3 * K_1 * K_2 + \ldots + Q_n * K_1 * K_2 * \ldots * K_{n-1} \quad (9)$$

If the number of tones is common to all dimensions, the quantization values can be labeled by $$IDX = \Sigma_{n=1}^{N} K^{n-1} Q_n \quad (10)$$

where K is the number of tones.

Note that any labeling method other than the above-described calculation method is usable if it is a calculation method capable of labeling.

When a database capable of searching for an image ID or the like using a quantization value as a key is constructed, matching between local feature amount can be performed at a high speed. This is called an image index.

Note that in this embodiment, a reference content ID is associated with a quantization value in an image index, instead of directly associating an image ID. The reference content ID is associated with the image ID by the link information managing unit.

[Partial Image Search Processing]

Partial similar image search processing of searching for an image similar to a query image using the image index will be described next. The partial similar image search is executed by the partial image searching unit 204. The partial image searching unit 204 extracts and quantizes local feature amounts from a query image and searches for reference content IDs in image indices. The partial image searching unit 204 counts the number of times a reference content ID has appeared. This method is similar to processing of casting a vote to a reference content ID including the local feature amounts of a query, and is therefore called a voting method. Details of partial image search processing according to this embodiment will be described below with reference to FIG. 8.

In step S801, the partial image searching unit 204 extracts local feature amounts from the query image. This processing is the same as the above-described local feature amount extraction processing. In step S802, the partial image searching unit 204 quantizes the local feature amounts obtained in step S801. The quantization method is the same as the above-described method. Steps S803 and S806 form a loop for local feature amounts. In this loop, assuming that the local feature amounts obtained in step S801 are assigned numbers, the local feature amounts are referred to by using the variable i. First, i is initialized to 1. If i is equal to or smaller than the number of local feature amounts, the process advances to step S804. If this condition is not met, the process exits from the loop and advances to step S807.

In step S804, the partial image searching unit 204 obtains a reference content ID having the local feature amount i. More specifically, the image indices are searched using the quantization value of the local feature amount i obtained in step S802, thereby obtaining a list of reference content IDs corresponding to the quantization value. In step S805, the partial image searching unit 204 counts up the appearance frequency for each reference content ID. Here, a table that holds a count value for each reference content ID is prepared in advance, and the count value of the reference content ID obtained in step S804 is added. The number of included local feature amounts of the query image is thus counted for each reference content ID. In step S806 that is the termination of the local feature amount loop, i is incremented by one, and the process returns to step S803.

In step S807, the partial image searching unit 204 sorts the table of reference content IDs and count values, which is updated in step S805, in descending order of count value. A list in which reference content IDs including many local feature amounts of the query image appear in higher ranks is thus obtained. A list that combines the reference content IDs and similarities is output as the result of partial image search processing, and the processing ends.

[Image Collation Using Local Feature Amounts]

There exist various image collation methods based on comparison of local feature points/local feature amounts. A method based on RANSAC (non-patent literature 3) will be described here. In RANSAC, the local feature amounts of a comparison source image and those of a comparison destination image are associated, and an affine transformation matrix that transforms the coordinate values of the comparison source image into the corresponding coordinate values of the comparison destination image is obtained.

More specifically, a local feature point of the comparison source image and a local feature point of the comparison destination image, which have the minimum inter-feature distances, are described in pair.

Next, three local feature points are selected from the comparison source image at random. An affine transformation matrix is obtained from the correspondence of coordinates between the local feature points and the local feature points of the comparison destination image, which have the minimum inter-feature distances. The coordinates of the remaining local feature points of the comparison source image are transformed into the coordinates of the comparison destination image using the affine transformation matrix. It is confirmed whether a pair of local feature points having the minimum inter-feature distance exists in the neighborhood of the local feature points. If a pair exists, one vote is cast. If no pair exists, no vote is cast.

Finally, if the number of votes reaches a predetermined value, it is determined that the comparison source image and the comparison destination image have partially matching regions. The larger the number of votes is, the larger the matching region is assumed to be. On the other hand, if the number of votes does not reach the predetermined value, processing of newly selecting three local feature points from the comparison source image at random and obtaining an affine transformation matrix is performed again. This reprocessing is repeated within a predetermined iterative count.

Even if the repetition reaches the iterative count, if the number of votes does not exceed the predetermined value, it is determined that there is no partially matching region, and the comparison processing ends. If a partially matching region exists, a local feature point of interest in the comparison source image and a corresponding local feature point can be obtained using the obtained affine transformation matrix and the pair of local feature points with the minimum inter-feature distance.

Effects of Embodiment

Conventionally, all target images to be registered are registered in image indices. In the first embodiment, however, if a target image to be registered is included in an already registered image, link information from the existing reference content to the target image to be registered is generated. Registration in an image index is thus avoided. Alternatively, only difference local feature amounts are registered, thereby reducing registration in image indices. In this embodiment, this can reduce bloating of image indices.

Since the size of image indices can be made much smaller than before, the usage of the disk capacity or memory capacity can be reduced.

As a detailed reduction ratio, for example, when an image index, link information, and the like use the following byte sizes, the reduction ratio of indices to link images is 1/1500.

Assume that "reference content ID" in link information shown in FIG. 3A has 4 bytes, "number of links" has 4 bytes, each element of "link image list" has 4 bytes, each element of "region information" has 16 bytes, and each element of "number of feature amounts" has 4 bytes. Also assume that "quantization value" in the image index shown in FIG. 3B has 4 bytes, and each element of "list of {reference content ID, x-coordinate, y-coordinate}" has 12 bytes.

Assume that 3,000 feature points are acquired per image. Conventionally, since only image indices are used, 12 bytes×3000=36 Kbytes are consumed per image by provisional calculation. In this embodiment, since an image index is generated for a reference image, 36 Kbytes are consumed similarly. Additionally, since link information is generated, 32 bytes are consumed. For this reason, about 36 Kbytes are consumed for a reference image. However, when an image identical of the reference image is registered, no image indices are generated, and therefore, the increase amount of the image indices is 0 byte. On the other hand, the link information increases only by 24 bytes. Hence, a total of only 24 bytes increases for the same link image. In the conventional method, image indices increase by 36 Kbytes even for a link image. Hence, when a link image corresponding to a reference image is registered, the decrease amount of indices is provisionally calculated as "36 Kbytes 24 bytes=1/1500".

Note that the conventional image indices do not need the coordinates of feature amounts, they may be omitted. At this time, if "quantization value" has 4 bytes, and "ID" has 4 bytes, the conventional image indices consume 8 bytes× 3000 points=24 Kbytes per image. For this reason, the decrease amount is provisionally calculated as 24 Kbytes 24 bytes=1/1000 from the second image.

However, the byte size of each element, details of link information, and the structure of an image index may be hanged. The decrease ratio changes accordingly. However, out of link information and image indices for one image, the size of the image indices is predominantly larger. Hence, the size is decreased almost alike.

To increase the search speed, the image indices are often arranged on a memory. If the size of the image indices is large, it may be impossible to arrange all the image indices on the physical memory. At this time, the image indices are arranged on the HDD by the function of the OS. Since the speed of referring to the HDD is extremely low as compared to the memory, the search speed lowers. This problem can also be avoided if the size of image indices can be made small by this embodiment.

If the image indices bloat, the speed of partial image search lowers. This is because a list of images corresponding to quantization values needs to be scanned at the time of partial image search. The longer the list length is, the lower the search speed is. In this embodiment, since the list length can be prevented from becoming long, it is possible to prevent the speed performance of partial image search for searching for image indices from lowering. On the other hand, it is necessary to do processing of acquiring a link image list from reference contents specified by the partial image search. However, the processing amount is relatively small as compared to the partial image search. For this reason, this embodiment can be expected to prevent the search speed from lowering as compared to a case where only image indices are used.

Second Embodiment

In the first embodiment, if a target image to be registered includes a reference content, the target image to be registered is registered in an image index, and link information to the existing reference content is not generated. In the second embodiment, an image search apparatus will be described which, upon determining that a target image to be registered includes an existing reference content, registers the target image to be registered as a new reference content and corrects the image that was the reference content immediately before to a link from the new reference content.

The arrangement of the image search apparatus according to the second embodiment is the same as the arrangement shown in FIG. 2 described in the first embodiment except the operation of a content register unit 201. In the first embodiment, when a target image to be registered included in an already registered image is given, the content register unit 201 generates link information from the already registered image and stores it in the link information managing unit 202. In addition, if the included image is not registered, the content register unit 201 stores the image feature amounts of the target image to be registered in the image index managing unit 203. In the second embodiment, additionally, if it is determined that the target image to be registered includes an existing reference content, the target image to be registered is registered as a reference content. In addition, pieces of information in a link information managing unit 202 and an image index managing unit 203 are corrected so as to change the image that was the reference content immediately before to a link from the new reference content.

Details of content registration processing of the content register unit 201 will be described below with reference to the flowchart of FIG. 9.

Figure 4:
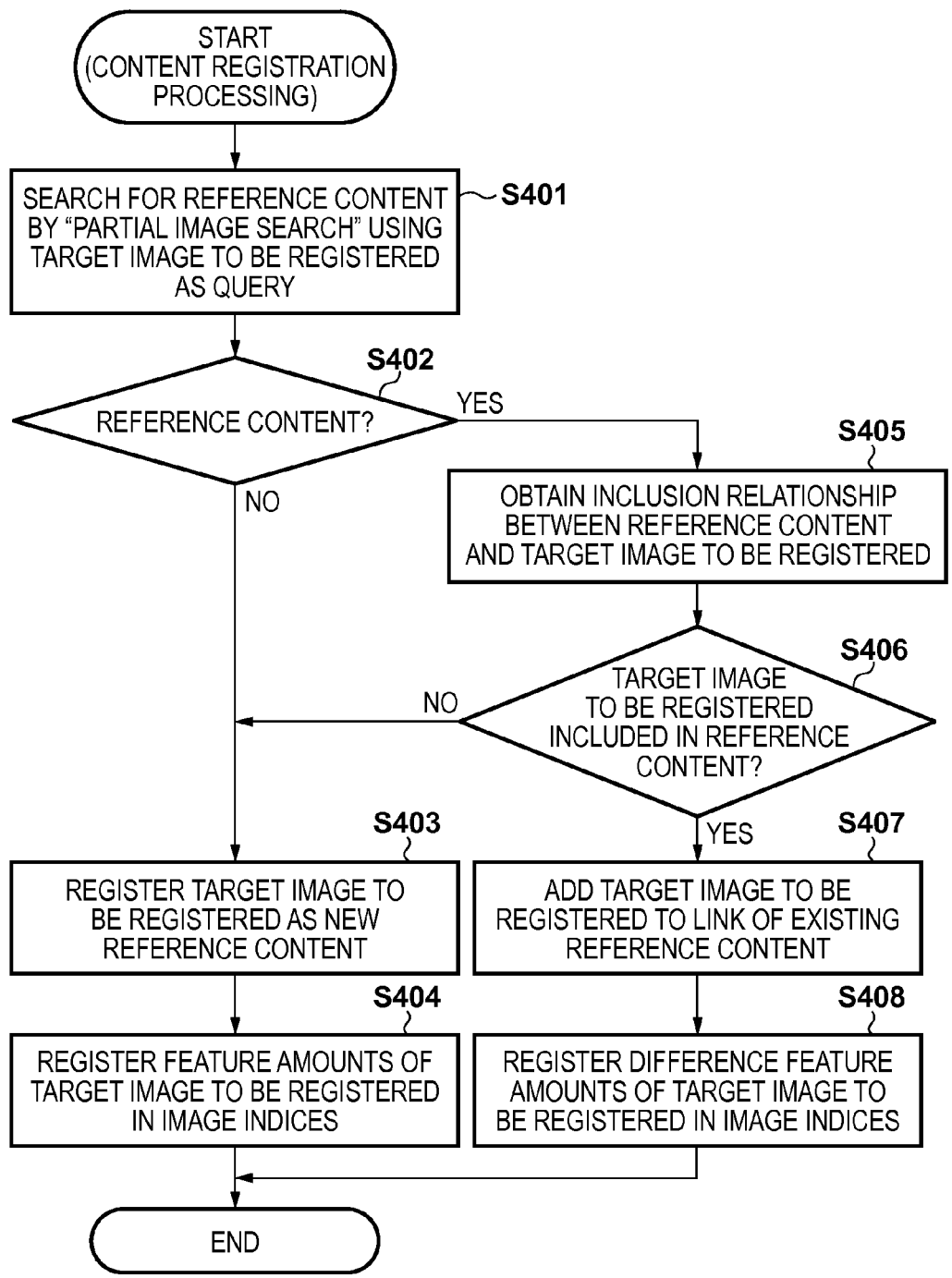
FIG. 4 is a flowchart of content registration processing according to the embodiment.

Steps S901 to S908 in FIG. 9 are the same as steps S401 to S408 in the flowchart of FIG. 4 according to the first embodiment except that if NO in step S906, the process advances to step S909. Processing from step S909 will be explained below.

In step S909, the content register unit 201 determines whether the target image to be registered includes the reference content. This determination is done based on the inclusion relationship obtained in step S905. If the target image to be registered includes the reference content, the process advances to step S910. Otherwise, the process advances to step S903.

In step S910, the content register unit 201 updates the link of the existing reference content so that the target image to be registered becomes a reference content. More specifically, the content register unit 201 specifies a record in the link information managing unit 202 using the reference content ID. The content register unit 201 increments the number of links by one. The content register unit 201 inserts the ID of the target image to be registered to the start of the link image list. Next, the content register unit 201 updates region information. To update the region information, the content register unit 201 first obtains a partial region of the target image to be registered, to which the existing reference content corresponds. To do this, using the image of the existing reference content as the comparison source and the target image to be registered as the comparison destination, the content register unit 201 obtains an affine transformation matrix using RANSAC described above. The content register unit 201 applies the affine transformation matrix to the coordinate values of the region information in the link information managing unit 202. More specifically, since the region information includes the coordinate values of the upper left and lower right corners of a rectangular region, the affine transformation matrix is applied to each coordinate value, thereby obtaining new region information. The pieces of region information representing the coordinate values on the reference content are thus transformed into coordinate values on the target image to be registered. Finally, the coordinate values of a rectangular region corresponding to the overall region of the target image to be registered are inserted to the start of the region information. The region information can thus be updated.

Next, the content register unit 201 updates the number of feature amounts. More specifically, out of the quantization values of the local feature amounts of the reference content, the number of quantization values that appear as the local feature amounts of the target image to be registered is counted as the number of feature amounts. Since this value is similar to the similarity obtained in step S901, the similarity may be used. The value is inserted to the start of the list of the numbers of feature amounts. The number of feature amounts can thus be updated.

In step S911, the content register unit 201 updates the coordinates of the local feature amounts of the image indices. More specifically, in the image index managing unit 203, the coordinates of the local feature amounts of the reference content IDs to be processed are rewritten by transformation using the affine transformation matrix obtained in step S910. In step S912, the content register unit 201 registers the difference local feature amounts of the target image to be registered in image indices. More specifically, the local feature amounts are extracted and quantized the target image to be registered. Next, in the image index managing unit 203, a list of (reference content IDs, x-coordinates, and y-coordinates) corresponding to the extracted quantization values is specified. If no reference content ID having an inclusion relationship exists in the list, the reference content ID and the coordinates of the local feature amounts on the reference content are added to the image index managing unit 203. Even if a reference content ID having an inclusion relationship exists in the list, different coordinates may be registered. If the quantization value itself does not exist, similar information is generated, and a record is added.

Note that in image index updating performed in steps S911 and S912, the local feature amounts of the existing reference content may temporarily be deleted, and the local feature amounts of the target image to be registered may newly be re-registered. More specifically, the content register unit 201 deletes "reference content ID, x-coordinate, and y-coordinate" having the reference content ID to be processed from the image index managing unit 203. After that, the content register unit 201 pairs the reference content ID to be processed and the coordinates of the local feature amounts on the registered image in association with the quantization values of the local feature amounts of the target image to be registered. The pair is registered in the image index managing unit 203. This obviates the necessity of rewrite of the coordinates of the existing local feature amounts and allows the image indices to be updated by simple processing.

With the above processing, when an image including an existing reference content is registered, link information is appropriately generated, and only difference feature amounts are registered in image indices. For this reason, bloating of image indices can be suppressed.

Third Embodiment

In an office, there are many opportunities for a plurality of persons to print the same document. In the information leakage suppression system of patent literature 2 described above, feature amounts are registered in the system every time the same document is printed. Hence, the same feature amounts are redundantly registered in the system a plurality of times. A search result is generated by performing comparison with all the registered feature amounts.

Since conventionally used non-local (global) feature amounts have a fixed size, and the feature amount size is small, a high-speed search is possible. Hence, the redundant database poses no serious problem.

However, the size of local feature amounts is larger by several hundred times to several thousand times than the conventional feature amount size. Hence, if the number of registered images is large, the database problematically bloats. The bloating of the database also affects the search speed. In the conventional method, the redundant registration accelerates the bloating of the database.

When printing a document in an office, there are many opportunities of reducing a document having a plurality of pages and printing the pages allocated to one page. Local feature amount that are the same in principle are extracted even from the reduced image. Hence, if the local feature amounts are directly registered, redundant registration is performed similarly.

The third embodiment provides a method of prohibiting local feature amounts extracted from the same image from redundantly being registered and enabling a search for the image. Note that an image processing apparatus according to the third embodiment is the same as in FIG. 1 of the first embodiment in terms of hardware arrangement, but the program stored in a ROM 102 is different. Hence, a description of the apparatus arrangement will be omitted.

Figure 10:
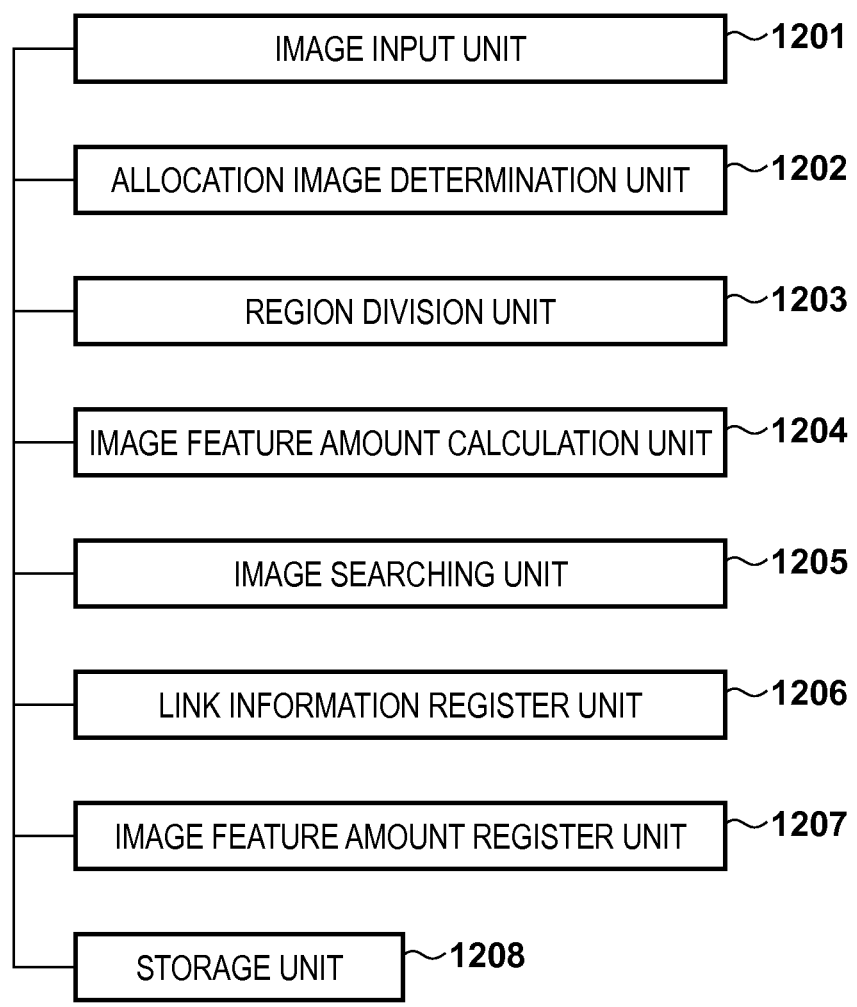
FIG. 10 is a block diagram showing an example of the functional arrangement of an image processing apparatus according to the third embodiment.

FIG. 10 is a block diagram showing the functional arrangement of an image processing apparatus according to the third embodiment when a CPU 101 executes the program stored in the ROM 102. Details of the operation of each component shown in FIG. 10 will be described later.

The third embodiment is directed to processing of calculating image feature amounts from an input image and registering them when searching for a similar image using the image feature amounts. The third embodiment is also directed to processing of calculating image feature amounts from an input image and comparing them with registered image feature amounts, thereby searching for a similar image. When registering an image (to be referred to as an allocation image hereinafter) generated by allocating a plurality of images, the allocation image is divided into the plurality of original images, image feature amounts are calculated from each image and registered. Each of the plurality of divided original images will be referred to as a reference image.

Figure 11A:
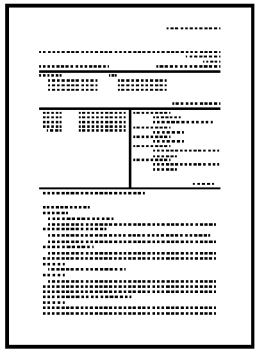
FIGS. 11A to 11G are views showing examples of input images according to the third embodiment.
Figure 11B:
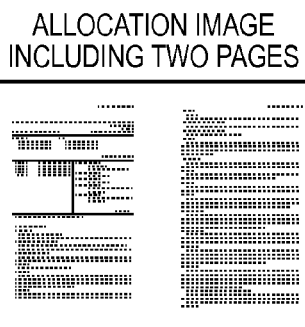
Figure 11C:
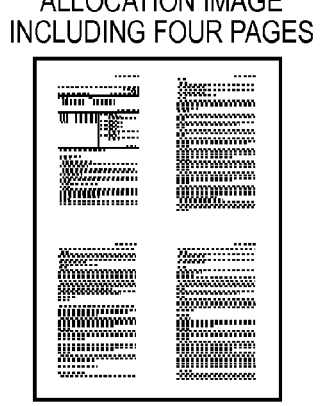
Figure 11D:
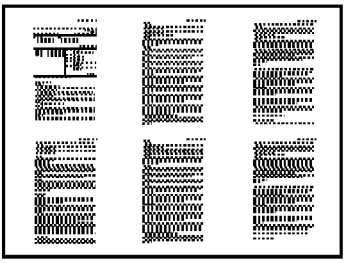
Figure 11E:
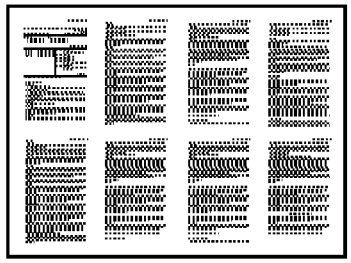
Figure 11F:
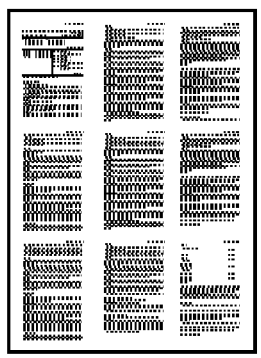
Figure 11G:
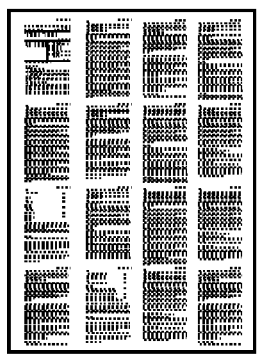

Referring to FIG. 10, an image input unit 1201 inputs a target image to be registered and a search source image (query image). In the third embodiment, an explanation will be made using, as a target image to be registered, an image generated by rasterizing a document, as shown in the example of FIG. 11A. This input image can also be generated by a printer driver when printing the document. Especially when generated by the printer driver, the print data can include information representing the number of pages to be printed in one printing paper sheet. This can be said to be convenient in this embodiment.

An allocation image determination unit 1202 determines whether the input image input by the image input unit 1201 is an allocation image, and if the image is an allocation image, determines the number of allocated pages. Here, the allocation image indicates an image having a plurality of pages of a document put together into one page (one sheet), as shown in the example of FIGS. 11B to 11G. This setting can be done when printing the document. When performing allocated printing, a plurality of pages are reduced to the same size and allocated to one printing paper sheet (in one image). Hence, the number of pages capable of allocated printing is 2, 4, 6, 8, 9, 16, 32, or the like. In general, allocating and printing N pages on one printing paper sheet is called N in 1. It is theoretically possible to evenly allocate pages more than 32 pages on one printing paper sheet (in one page), and the number of pages is not limited to these. When performing allocation, for example, when generating an allocation image including four pages from a document having three pages, a blank page is inserted to the position of the fourth page. Upon determining that the image is an allocation image, the allocation image determination unit 1202 further determines the number of pages allocated in the allocation image. An explanation will be made assuming that it is determined that N pages are allocated to the allocation image.

When the allocation image determination unit 1202 determines that N pages are allocated to the allocation image, a region division unit 1203 divides the input image into N regions. The allocation method is determined in advance, and the allocation image is divided in accordance with the method. An image feature amount calculation unit 1204 calculates image feature amounts of the input image when the input image is not an allocation image, or calculates image feature amounts of each of the regions divided by the region division unit 1203 when the input image is an allocation image.

Using the image feature amounts calculated by the image feature amount calculation unit 1204 as a search source, an image searching unit 1205 compares them with the image feature amounts of an already registered image and searches for a similar image. If the image searching unit 1205 has found a similar image, a link information register unit 1206 registers link information representing that the image of the image feature amounts as the search source is the same image as the similar image. If the image searching unit 1205 has not found a similar image, an image feature amount register unit 1207 registers the image feature amounts as the search source. A storage unit 1208 is a memory/HDD that stores data under processing, various kinds of indices, image files, and the like. Note that the components are generally controlled by a CPU (not shown).

[Registration Processing]

Figure 12:
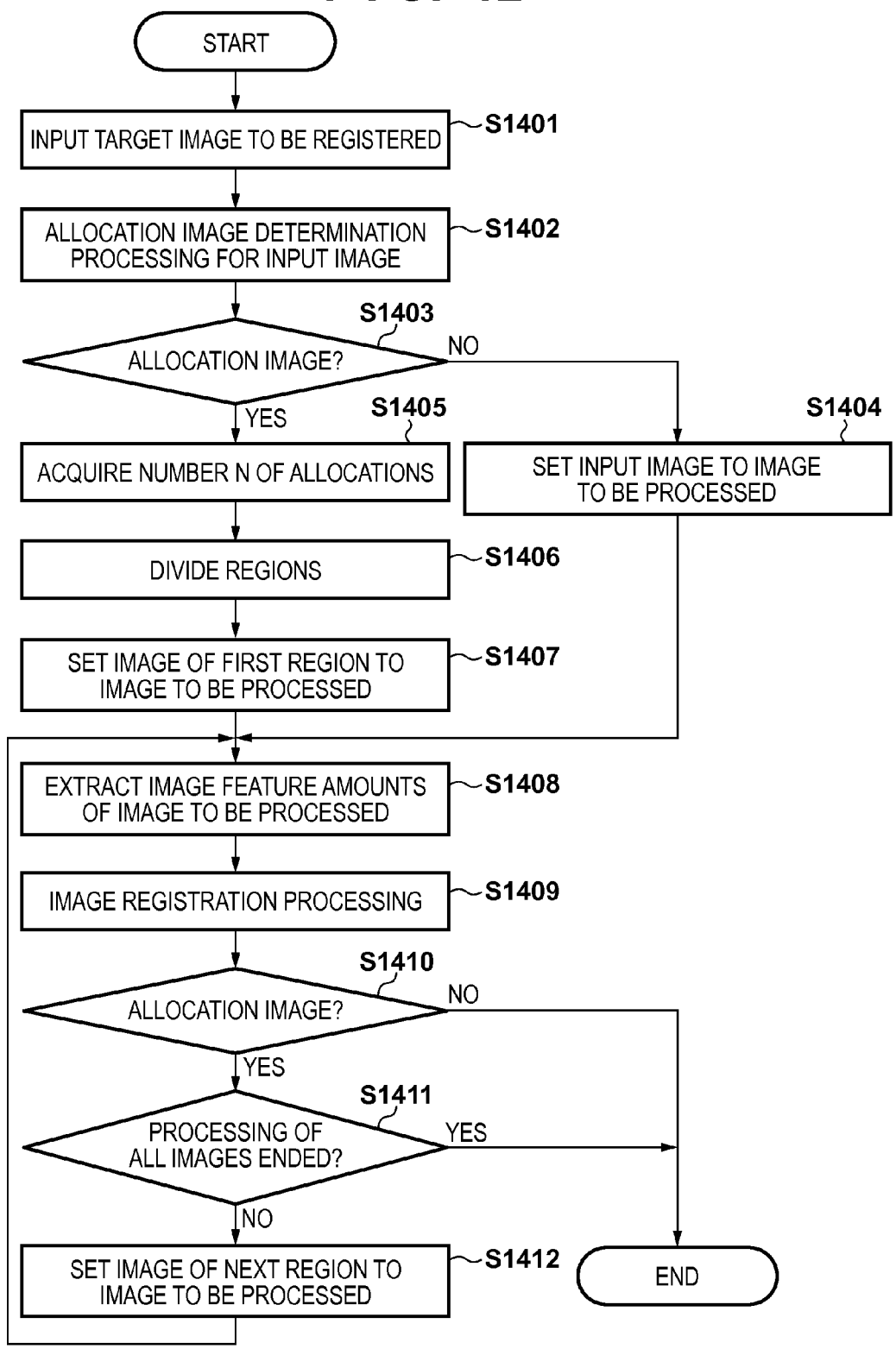
FIG. 12 is a flowchart showing an example of registration processing according to the third embodiment.

FIG. 12 is a flowchart showing an example of a registration processing procedure in the image processing apparatus according to the third embodiment.

In step S1401, a target image to be registered is input via the image input unit 1201. An image ID is assigned to the input target image to be registered. In the third embodiment, for example, a case where an image rasterized by a printer driver when printing a document is input will be described. The input image is stored in the storage unit 1208.

In step S1402, the allocation image determination unit 1202 determines whether the input target image to be registered is an allocation image. As described above, an allocated printing instruction can be input by setting the printer driver when printing a document. In this embodiment, information accompanying the input image is used. If the input image is not an allocation image in step S1403, the process advances to step S1404 to set the input image to an image to be processed. If the input image is an allocation image, the number N of allocations indicating the number of page images that construct the input target image to be registered is acquired in step S1405. As for the number N of allocations as well, information set by the printer driver is used. However, the information is not limited the information set by the printer driver, and operation information of a device such as a printer or a multi function peripheral may be used. For example, when a document is copied by a multi function peripheral, two sheets can be allocated to one sheet and copied. Such information is also usable.

In step S1406, the region division unit 1203 divides the input image into N regions. This division is done using a division method determined in advance, and the input image is divided into regions of a uniform size. In step S1407, the image of the first region of the N divided regions is set to the image to be processed. In step S1408, the image feature amount calculation unit 1204 extracts the image feature amounts of the image to be processed decided in step S1404 or S1407.

FIG. 13 is a flowchart showing an example of the image feature amount extraction processing procedure of step S1408. In the third embodiment, local feature amounts of the image are used as the image feature amounts. In step S1501, luminance components are extracted from the image to be processed, and a luminance component image is generated based on the luminance components. In step S1502, the luminance component image is sequentially repetitively reduced in accordance with a magnification (reduction ratio) p, thereby generating n reduced images including the original image, which are reduced stepwise from the image of the original size. The magnification p and the number n of reduced images are determined in advance. When $p=2^{-1/4}$ and n=9, the same processing as in FIG. 6B described in the first embodiment is performed.

In step S1503, local feature points capable of being robustly extracted even when the n reduced images rotate are extracted. In the third embodiment, a Harris operator described in the first embodiment is used as the method of extracting the local feature points (see non-patent literature 1).

Note that any feature point extraction method other than the feature point extraction method by the above-described Harris operator is applicable if a local feature point can be extracted.

In step S1504, a feature amount (local feature amount) defined to be invariant even in case of rotation of the image is calculated for each of the local feature points extracted in step S1503. In the third embodiment as well, a combination of Local Jets and derivatives thereof is used as the local feature point calculation method (see non-patent literature 4).

More specifically, a local feature amount V is calculated by equation (1) described in the first embodiment.

In step S1505, the image feature amounts extracted in step S1504 are quantized, thereby generating quantized image feature amounts of the image to be processed.

An image feature amount used in the third embodiment, that is, a local feature amount calculated from each local feature point by the combination of Local Jets and derivatives thereof is an N-dimensional vector. Here, quantization in $K_n$ tones is done for the feature amount of the nth dimension out of the N dimensions. N and K are determined in advance.

More specifically, equation (8) is shown below again.

$$Q_n=(V_n*K_n)/(V_{n\_max}-V_{n\_min}+1) \quad (8)$$

In equation (8), $Q_n$ is the value obtained by quantizing the feature amount $V_n$ of the nth dimension out of the N dimensions, and $V_{n\_max}$ and $V_{n\_min}$ are the maximum value and the minimum value, respectively, that the feature amount of the nth dimension can take.

The quantization values of the respective dimensions are put together, thereby obtaining quantized image feature amounts. All quantized image feature amounts of the image to be processed are put together, thereby obtaining a quantized image feature amount group.

Note that in the above quantization, the number of quantized tones is determined for each dimension. However, the number of tones common to all or some dimensions may be used. This quantization method is a method of dividing the feature amount space into a lattice as shown in FIG. 7A. However, the feature amount space may be divided into a lattice as shown in FIG. 7B. In FIG. 7A, reference numeral 701 denotes a quantization region in the feature amount space; and 702, a feature. Both FIGS. 7A and 7B show examples in which a two-dimensional feature amount space is divided and quantized. The feature amount space is extended to a multidimensional space corresponding to the number of dimensions of local feature points and then divided.

Any division method other than the quantization method based on the above-described rule is applicable if the feature amount space can be divided. For example, a clustering rule may be created by mechanically learning a plurality of images, and the feature amount space may be divided and quantized based on the rule.

After quantization for each dimension, the quantization values may be labeled by equation (9) described above so as to be substantially handled like one-dimensional feature amounts.

If the number of tones is common to all dimensions, the quantization values can be labeled by equation (10). In equation (10), K is the number of tones. Note that any labeling method other than the above-described calculation method is applicable if it is a calculation method capable of labeling. In the third embodiment as well, a labeled value IDX is called a feature amount ID.

Details of the process of step S1408 in FIG. 12 have been described above. Next, in step S1409, using the image feature amounts calculated by the image feature amount calculation unit 1204 as a search source, the image searching unit 1205 compares them with already registered image feature amounts and searches for a similar image. Based on the result, the link information register unit 1206 or the image feature amount register unit 1207 registers the image to be processed.

An example of the image registration processing of step S1409 will be described here with reference to the flowchart of FIG. 14.

In step S1801, using the image feature amounts calculated in step S1408 as a search source, the image searching unit 1205 compares them with the image feature amounts of an already registered reference image and searches for a similar reference image. In similar reference image search processing, comparison with the image feature amounts of already registered reference images is performed, and similarities are calculated. A result sorted in the descending order of similarity is obtained. Details of the similar reference image search processing will be described later.

If a search result of a predetermined similarity or more does not exist in step S1802, the process advances to step S1803 to register the image feature amounts of the image to be processed. That is, the image to be processed is registered as a new reference image.

FIGS. 15A and 15B show examples of schemas when registering image feature amounts in the database. These are merely examples, and a schema of another type may be used.

FIG. 15A shows an example of a schema that associates an image ID and a reference image ID. The image ID is an ID added to the target image to be registered. The reference image ID is an ID added to each of reference images divided on a page basis when the target image to be registered is an allocation image. If the target image to be registered is not an allocation image, a reference image ID is added to the target image to be registered. In this schema, which region of the target image to be registered is the reference image is stored as region information. As the region information, for example, the pixel values at the coordinates of the upper left and lower right corners are stored. Each of the reference image IDs and the image IDs is stored using an 8-byte type, although it depends on the number of target images to be registered. The region information is stored using four values of a 2-byte type. Hence, to register one reference image, a 24-byte storage area is necessary. However, this storage size is merely an example and is not limited to this value.

FIG. 15B shows an example of a schema that associates a feature amount ID and a reference image ID. Here, the feature amount ID is a label value when an image feature amount is labeled. Since image feature amounts of the same feature amount ID may be calculated from a plurality of reference images, a plurality of reference image IDs may be associated with one feature amount ID. In this schema, the pixel values at the coordinates of the feature points are also stored. Image feature amounts of the same feature amount ID may be calculated from one reference image. In this case, the feature point coordinates are listed, and the list itself is held as a list. The values of the image feature amounts are also stored. Each of the feature amount IDs and the reference image IDs is stored using an 8-byte type. The feature point coordinates are stored using two values of a 2-byte type. Here, an image feature amount is assumed to be expressed by a 128-dimensional double-precision decimal type, and is stored using 128 values of an 8-byte type. Hence, to register one feature point, an about 1-Kbyte storage area is necessary. In general, several thousand feature points are extracted from one reference image. When the number of feature points extracted from one reference image is 3,000, an about 3-Mbyte storage area is needed to register one reference image. The storage area can be made small by decreasing the number of dimensions of the image feature amount by principal component analysis or the like or by using a fixed decimal type in place of the double-precision decimal type.

Referring back to the procedure of FIG. 14, if a search result of a predetermined similarity or more exists in step S1802, the process advances to step S1804. In step S1804, the matching region between the image to be processed and the search result image is specified. In matching region specifying processing, an inclusion ratio RQ and location of the matching region in the image to be processed and an inclusion ratio RS and location of the matching region in the search result image are obtained, as shown in the examples of FIGS. 16A to 16D.

FIGS. 16A to 16D show the relationship between the image to be processed and the search result image. In FIGS. 16A to 16D, reference numerals 1100 to 1103 on the left side denote examples of an image to be processed; and 1110 to 1113 on the right side, examples of a search result image. In each drawing, a range surrounded by a thick line rectangle indicates the matching region and its location. The dotted lines indicate the positions of matching regions in association. A numerical value (%) starting with RQ on a side of each image represents the ratio of the matching region in the image to be processed, and a numerical value starting with RS represents the ratio of the matching region in the search result image. 100% represents that the matching region corresponding to the entire image.

Figure 16A:
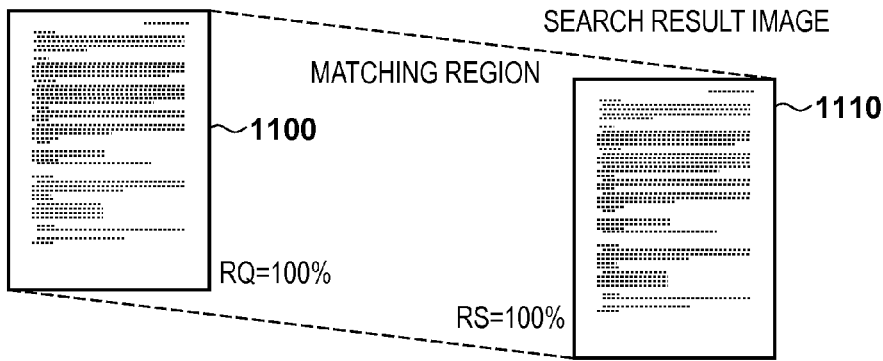
FIGS. 16A to 16D are views showing examples of matching region specifying processing results according to the third embodiment.
Figure 16B:
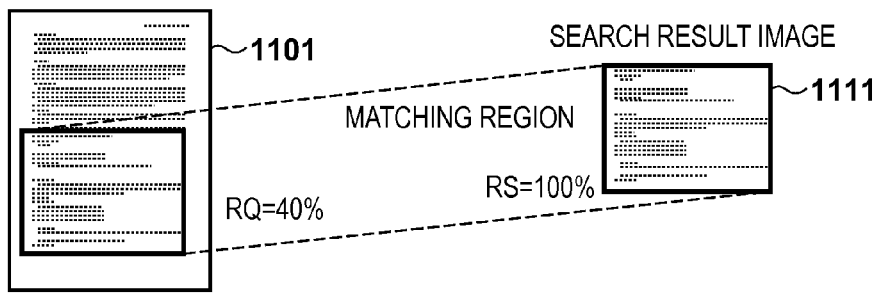
Figure 16C:
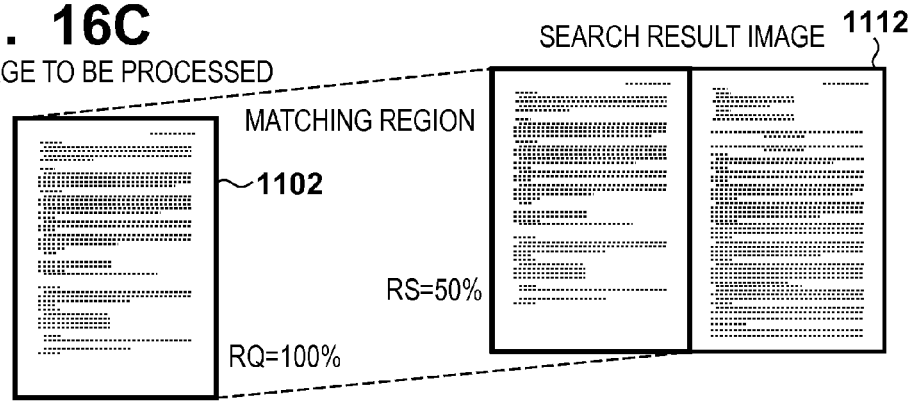

As for the relationship of the matching region between the image to be processed and the search result image, the image to be processed and the search result image match almost as a whole, like the relationship shown in FIG. 16A, or the image to be processed includes the search result image, like the relationship shown in FIG. 16B. Alternatively, the image to be processed forms part of the search result image, like the relationship shown in FIG. 16C or 16D. A search result image 1112 shown in FIG. 16C is an image that includes two pages and should therefore originally be registered on a page basis. The image is an image registered without being determined as an allocation image due to some influence in step S1402 at the time of registration. Details of matching region specifying processing will be described later.

In step S1805, the inclusion ratio RQ of the matching region in the image to be processed is compared with the inclusion ratio RS of the matching region in the search result image, and if the ratios are almost the same, the process advances to step S1806. Here, almost the same ratio means that RS falls within a range with a margin of, for example, ±10% with respect to RQ. The value of the margin of 10% is merely an example, and this value may be obtained by experiments or set by the system administrator. If RQ and RS are almost the same ratio, the image to be processed and the search result image can be considered as the same image. Hence, in step S1806, link information from the image to be processed to the search result image is registered. Instead of newly registering the image feature amounts, only information representing that the image feature amounts are the same as already registered image feature amounts is registered.

For example, assume that the image ID of the image to be processed is 5, and the ID of the search result reference image is 1. In this case, the table that manages image IDs and reference image IDs shown in FIG. 15A is updated as shown in FIG. 17. That is, as shown in FIG. 17, "5" is inserted (added) into the "image ID" field in the record of the reference image ID "1", and the coordinate information of the matching region of the image to be processed is inserted into the region information. The storage capacity necessary to register one reference image is only a total of 16 bytes including 8 bytes of the image ID and 8 bytes of the region information. Since a storage capacity of about 3 Mbytes is required to register image feature amounts, the storage capacity can largely be reduced, as can be seen.

If the values of RQ and RS are not almost the same in step S1805, the process advances to step S1807. If RQ is smaller than RS in step S1807, the process advances to step S1803 to register the image feature amounts of the image to be processed. The case where RQ is smaller than RS corresponds to the case where the image to be processed includes the search result image, as shown in FIG. 16B.

Figure 16D:
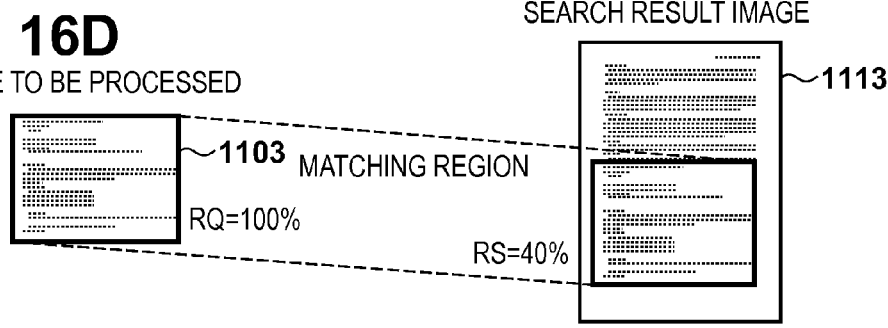

If RQ is larger than RS in step S1807, the process advances to step S1808. The case where RQ is larger than RS corresponds to the case where the search result image includes the image to be processed, as shown in FIG. 16C or 16D. In FIG. 16C, the image to be processed corresponds to one page of the allocation image. In FIG. 16D, the image to be processed corresponds to not one page of the allocation image but simply part of the search result image. In step S1808, it is determined which state the image to be processed has, that is, whether the search result image is an allocation image. If the search result image is an allocation image, the number of allocations and the allocation position are acquired.

Figure 18:
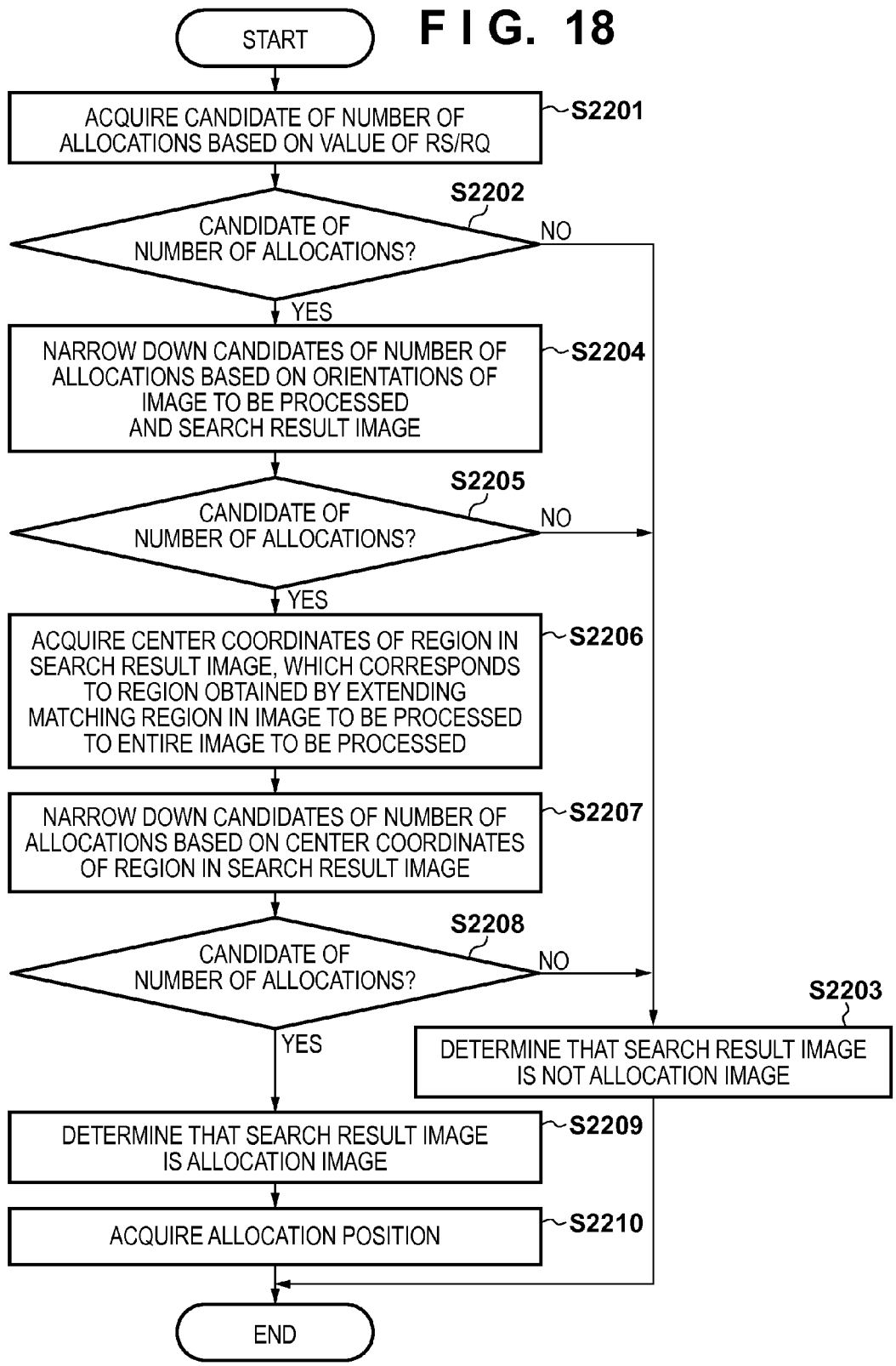
FIG. 18 is a flowchart showing allocation image determination processing according to the third embodiment.

FIG. 18 is a flowchart showing an example of the allocation image determination processing procedure for the search result image in step S1808.

In step S2201, a candidate of the number of allocations is acquired based on the value of RS/RQ. A description will be made here using the examples of allocation images shown in FIGS. 11B to 11G in which the numbers of pages are 2, 4, 6, 8, 9, and 16. FIG. 19 is a table that summarizes information about allocation images. Ratio in the table of FIG. 19 indicates the reduction ratio of each page in allocation. Rotation indicates whether to rotate an image by 90°. Yes means that the image is rotated, and No means that the image is not rotated. When the image is rotated, the orientation of the allocation image is rotated by 90° from the orientation of the image to be allocated. Center x-coordinate and center y-coordinate indicate the x- and y-coordinates at the center of the allocated page as ratios with respect to the width or height that is defined as 1. Coordinates that combine one of the center x-coordinates and one of the center y-coordinates are the center coordinates of the allocated page.

In step S2201, the number of allocations for which the value of RS/RQ is almost the same value as the ratio in the table of FIG. 19 is obtained as a candidate of the number of allocations. Here, almost the same value means that the value of RS/RQ falls within a range with a margin of, for example, ±10% with respect to the ratio in the table of FIG. 19. The value of the margin of 10% is merely an example, and this value may be obtained by experiments. The value of the margin may be changed for each number of allocations. At this point of time, a plurality of candidates may exist.

If no candidate of the number of allocations exists in step S2202, the process advances to step S2203 to determine that the search result image is not an allocation image. If a candidate of the number of allocations exists in step S2202, the process advances to step S2204.

In step S2204, the candidates of the number of allocations are narrowed down based on the orientations of the image to be processed and the search result image, that is, whether the images are portrait images or landscape images. If the orientations of the images are the same, only numbers of allocations for which rotation in the table of FIG. 19 is No are left as the candidates of the number of allocations, and the remaining numbers of allocations are excluded from the candidates of the number of allocations. If the orientations of the images are different, only numbers of allocations for which rotation in the table of FIG. 19 is Yes are left as the candidates of the number of allocations, and the remaining numbers of allocations are excluded from the candidates of the number of allocations.

If no candidate of the number of allocations exists in step S2205, the process advances to step S2203 to determine that the search result image is not an allocation image. If a candidate of the number of allocations exists in step S2205, the process advances to step S2206.

Figure 20:
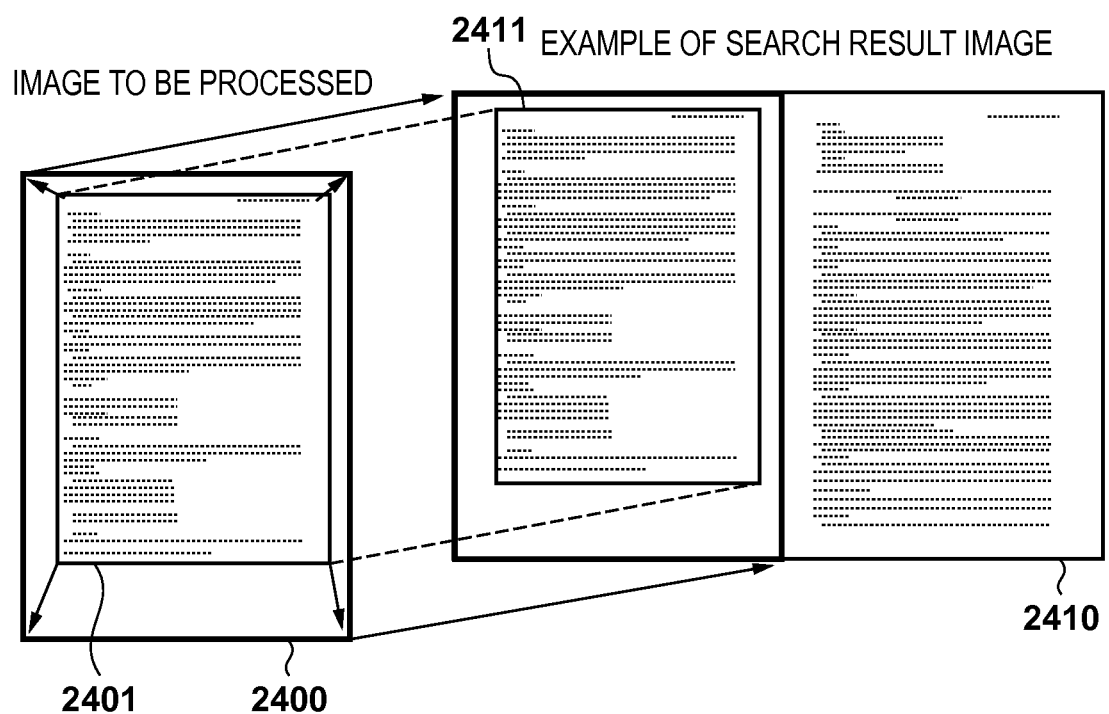
FIG. 20 is a view for explaining the region of a search result image corresponding to a region when a matching region in an image to be processed is extended to the entire image to be processed according to the third embodiment.

In step S2206, a region in the search result image corresponding to a region obtained by extending the matching region in the image to be processed to the entire image to be processed is obtained, and the center coordinates of the region are acquired. Assume that a region surrounded by thin lines 2401 in an image 2400 to be processed in FIG. 20 is a matching region, and this region is extended to the entire region of the image surrounded by the thick lines. At this time, when a matching region surrounded by thin lines 2411 in a search result image 2410 is extended in the same directions by the same ratios, the region of the search result image corresponding to the entire region of the image to be processed can be obtained. The center coordinates of the region are then acquired.

In step S2207, the candidates of the number of allocations are narrowed down based on the center coordinates of the region of the search result image. That is, only numbers of allocations for which one of the center x-coordinate and the center y-coordinate in the table of FIG. 19 has almost the same value as the center coordinate of the region of the search result image are left as the candidates of the number of allocations, and the remaining numbers of allocations are excluded from the candidates of the number of allocations.

If no candidate of the number of allocations exists in step S2208, the process advances to step S2203 to determine that the search result image is not an allocation image. If a candidate of the number of allocations exists in step S2208, the process advances to step S2209 to determine that the search result image is an allocation image. In step S2207, the inclusion position, that is, the allocation position is acquired based on which center x-coordinate or center y-coordinate is almost the same as the center coordinate.

The allocation image determination processing for the search result image in step S1808 thus ends.

Referring back to the procedure of FIG. 14, if the search result image is not an allocation image in step S1809, the process advances to step S1803 to register the image feature amounts of the image to be processed. If the search result image is an allocation image, the process advances to step S1810 to re-register the search result image in a state in which the image is divided in accordance with the allocation method.

Figure 21:
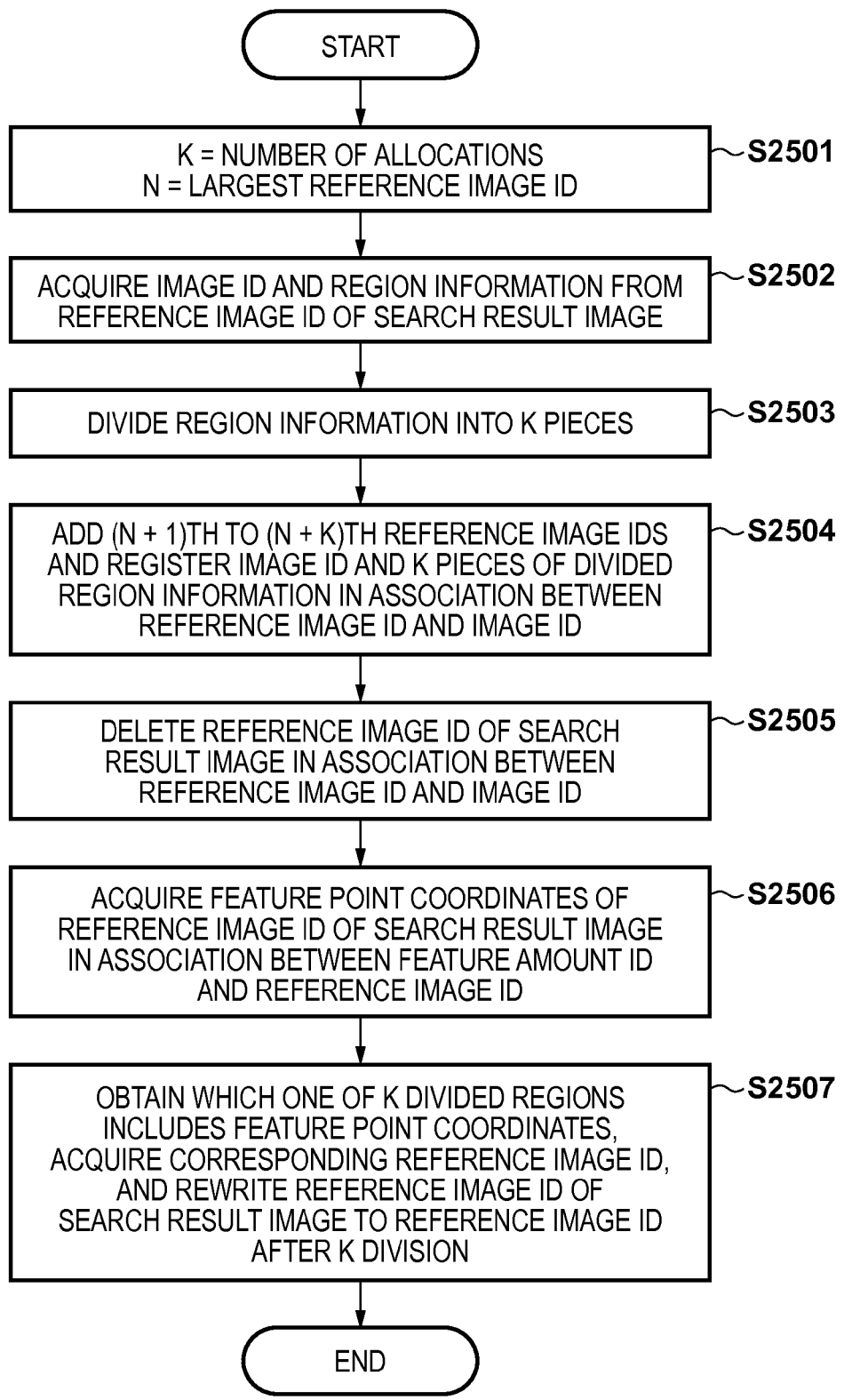
FIG. 21 is a flowchart showing an image division/re-registration processing procedure according to the third embodiment.

FIG. 21 is a flowchart showing an example of a division/re-registration processing procedure for the search result image in step S1810. Details of step S1810 will be described with reference to FIG. 21. In step S2501, the number of allocations of the search result image is substituted into K, and the largest number of registered reference image IDs is substituted into N. In step S2502, an image ID and region information are acquired from the reference image ID of the search result image by looking up the association table of reference image IDs and image IDs. In step S2503, the obtained region information is divided into K pieces in accordance with the allocation method determined in advance by the number of allocations.

In step S2504, (N+1)th to (N+K)th reference image IDs are added to the association table of reference image IDs and image IDs. In addition, the image ID obtained in step S2502 and the K pieces of divided region information obtained in step S2503 are registered in association with the reference image IDs. In step S2505, the reference image ID of the search result image is deleted from the association table of reference image IDs and image IDs.

In step S2506, the feature point coordinates of the reference image ID of the search result image are acquired by looking up the association table of feature amount IDs and reference image IDs. In step S2507, which one of the K divided regions includes the feature point coordinates obtained in step S2506, and a corresponding reference image ID is obtained. The reference image ID of the search result image is rewritten to the reference image ID after K division.

Referring back to the procedure of FIG. 14, in step S1811, link information from the image to be processed to a corresponding one of the plurality of images obtained by allocation division of the search result image is registered. The process of step S1811 is the same as the process of step S1806. With the processes of steps S1810 and S1811, even when an allocation image is temporarily registered as a reference image due to some reason, if one page image included in the allocation image is input as an image to be processed, each page included in the allocation image is re-registered as a reference image.

The processes of steps S1810 and S1811 will be described using a detailed example. A case where additional registration from the states in FIGS. 15A and 15B will be explained. Assume that the image to be processed and the search result image have a relationship shown in FIG. 16C. Assume that the image ID of the image to be processed is 5, and the ID of the search result image is 4. As shown in FIG. 16C, the search result image is an allocation image including two pages, and the left half matches the image to be processed. Since one reference image (reference image ID is 5) has been registered for the search result image, this image is registered newly as two reference images. If the largest registered reference image ID is 5, the left page is registered as a reference image ID of 6, and the right page is registered as a reference image ID of 7. FIGS. 22A and 22B show the states of the tables after division/re-registration.

For the association of reference image IDs and image IDs shown in FIG. 22A, reference image IDs 6 and 7 are added, and an image ID 4 registered in association with the reference image ID 5 is inserted. In addition, the left region information of the region information with the image ID 4 registered in association with the reference image ID 5 is inserted into the row of the reference image ID 6 as region information, and the right region information is inserted into the row of the reference image ID 7 as region information. The row of the reference image ID 5 is deleted. Furthermore, the link information of the image to be processed is added. That is, 5 is inserted into the image ID of the row of the reference image ID 6, and the coordinate information of the image to be processed is inserted into the region information.

For the association of feature amount IDs and reference image IDs shown in FIG. 22B, feature amount IDs for which the reference image ID is registered are searched. The feature amount IDs 1 and 4 are acquired from FIG. 15B. Pieces of coordinate information of the feature points are acquired. Since it is found that the coordinates of the feature point registered in the feature amount ID 1 correspond to a point existing in the left page of the search result image, the reference image ID is changed from 5 to 6. Since it is found that the coordinates of the feature point registered in the feature amount ID 4 correspond to a point existing in the right page of the search result image, the reference image ID is changed from 5 to 7.

Image registration processing in step S1409 of FIG. 12 thus ends. Referring back to the procedure of FIG. 12, if the input image is not an allocation image in step S1410, the registration processing according to the third embodiment ends. If the input image is an allocation image, the process advances to step S1411.

If processing of all images has ended in step S1411, the image registration processing according to the third embodiment ends. If processing of all images has not ended, the image of the next region is set to the image to be processed in step S1412, and the processing is repeated from step S1408.

[Similar Reference Image Search Processing]

Figure 23:
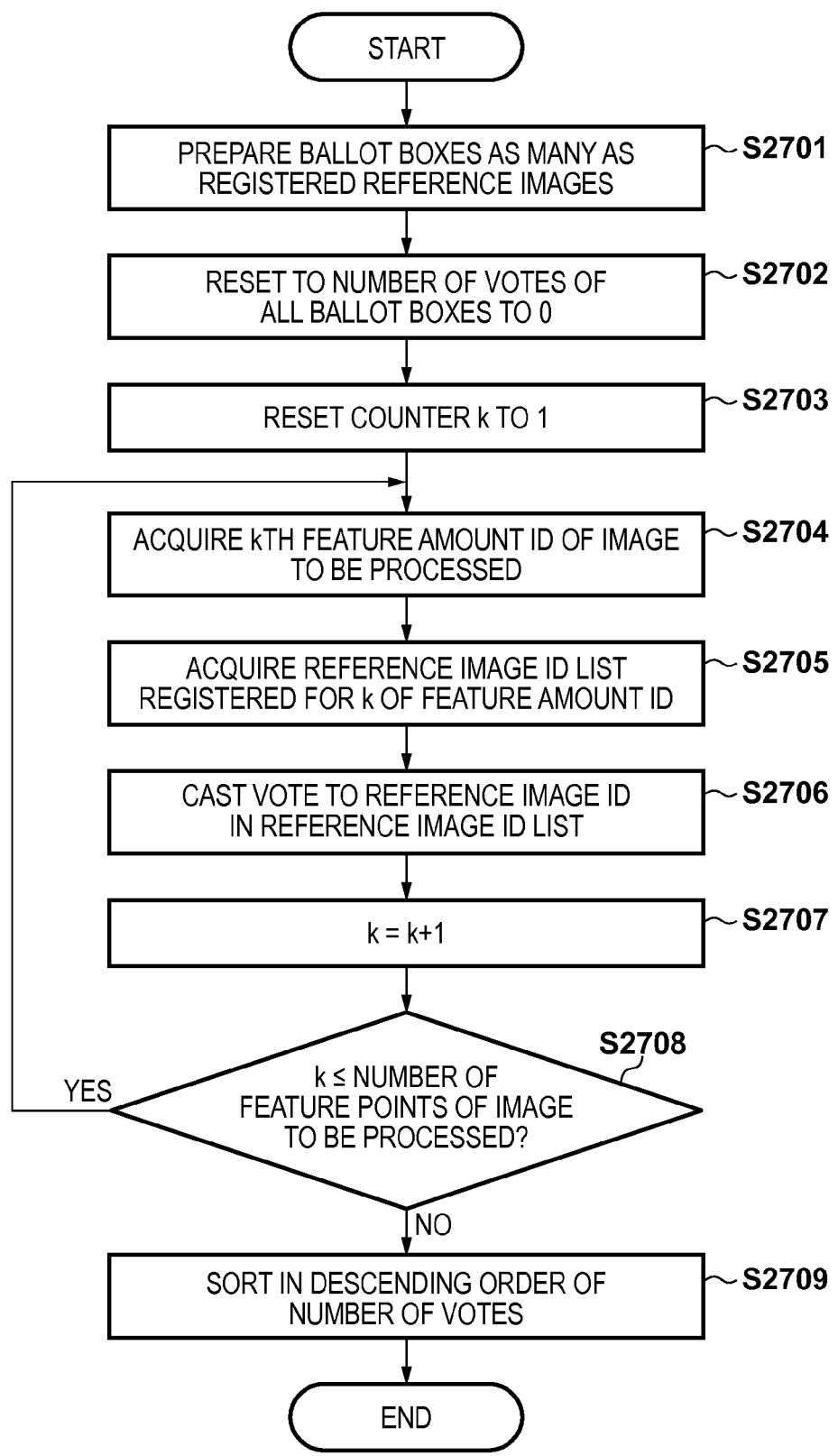
FIG. 23 is a flowchart showing a similar reference image search processing procedure according to the third embodiment.

Details of similar reference image search processing in step S1801 of FIG. 14 will be described here with reference to the flowchart of FIG. 23. The search processing method to be explained here is a method also called a voting method.

In step S2701, ballot boxes as many as registered reference images are prepared. This processing is technically processing of allocating, on a RAM 103, a variable used to store the number of votes for each reference image.

In step S2702, the numbers of votes of all ballot boxes are reset to 0. In step S2703, a counter k is reset to 1. In step S2704, the kth feature amount ID of the image to be processed is acquired. In step S2705, a reference image ID list registered in k of the feature amount ID is acquired. In step S2706, votes are cast in the ballot boxes of all reference image IDs in the reference image ID list. The number of votes to be cast can always be 1 or set based on the similarity of the feature amount. The number of votes may be based on the coordinates of the feature point.

In step S2707, the counter k is incremented by one. If the counter k is equal to or less than the number of feature points of the image to be processed in step S2708, the process returns to step S2704. If the counter k exceeds the number of feature points, the process advances to step S2709. Finally in step S2709, sorting is performed in ascending order of number of votes.

Note that when feature amounts are quantized, the quantization values may be different even if the feature amounts are similar. In this case, the feature amount IDs are different. As a measure against this, in step S2705, not only the reference image ID list registered in k of the feature amount ID but also reference image IDs registered in feature amount IDs having high similarities to k of the feature amount ID are acquired. In step S2706, a method of casting votes to all the reference image IDs may be employed.

[Matching Region Specifying Processing]

Details of matching region specifying processing in step S1804 of FIG. 14 will be described here with reference to the flowchart of FIG. 24.

In step S2801, a feature point of a comparison destination image, which has the shortest inter-feature-amount distance with respect to a feature point of a comparison source image, is defined as a corresponding point, and a list of corresponding points is created as a shortest distance corresponding point list. More specifically, the inter-feature-amount distances between the feature amount of a certain feature point of the comparison source image and all feature amounts of the comparison destination image are calculated. If the shortest distance is equal to or less than a threshold value Tv, a feature point ID of the comparison source image and a feature point ID of the comparison destination image, which have the shortest distance, are defined a shortest distance corresponding points and registered in the shortest distance corresponding point list. At this time, the coordinates of the feature points and the inter-feature-amount distance are also registered. This processing is performed for all feature points of the comparison source image, thereby creating the shortest distance corresponding point list. A schema of the shortest distance corresponding point list is formed from, for example, a feature point ID of the comparison source image and its coordinates and a feature point ID of the comparison destination image and its coordinates, as shown in FIG. 19. However, these items need not always exist in one schema. It is only necessary to obtain these pieces of information by connecting a plurality of schemas.

An explanation will be made from this point assuming that m sets of shortest distance corresponding points are registered in the shortest distance corresponding point list. For the kth corresponding point registered in the shortest distance corresponding point list, the feature point IDs of the comparison source image and the comparison destination image are represented by Qk and Sk, respectively. The feature point coordinates are represented by (x'k, y'k) and (xk, yk).

In step S2802, only corresponding points assumed to be correct corresponding points on an actual image are selected from the shortest distance corresponding point list created in step S2801, thereby creating a correct corresponding point list. Similar feature amounts exist in one image. Hence, the corresponding points associated based on only the shortest inter-feature-amount distance, that is, the corresponding points created in step S2801 include points that do not correctly correspond on an actual image. In this processing, corresponding points assumed to be correct corresponding points are selected using the positional relationship between the plurality of feature points.

Figure 26A:
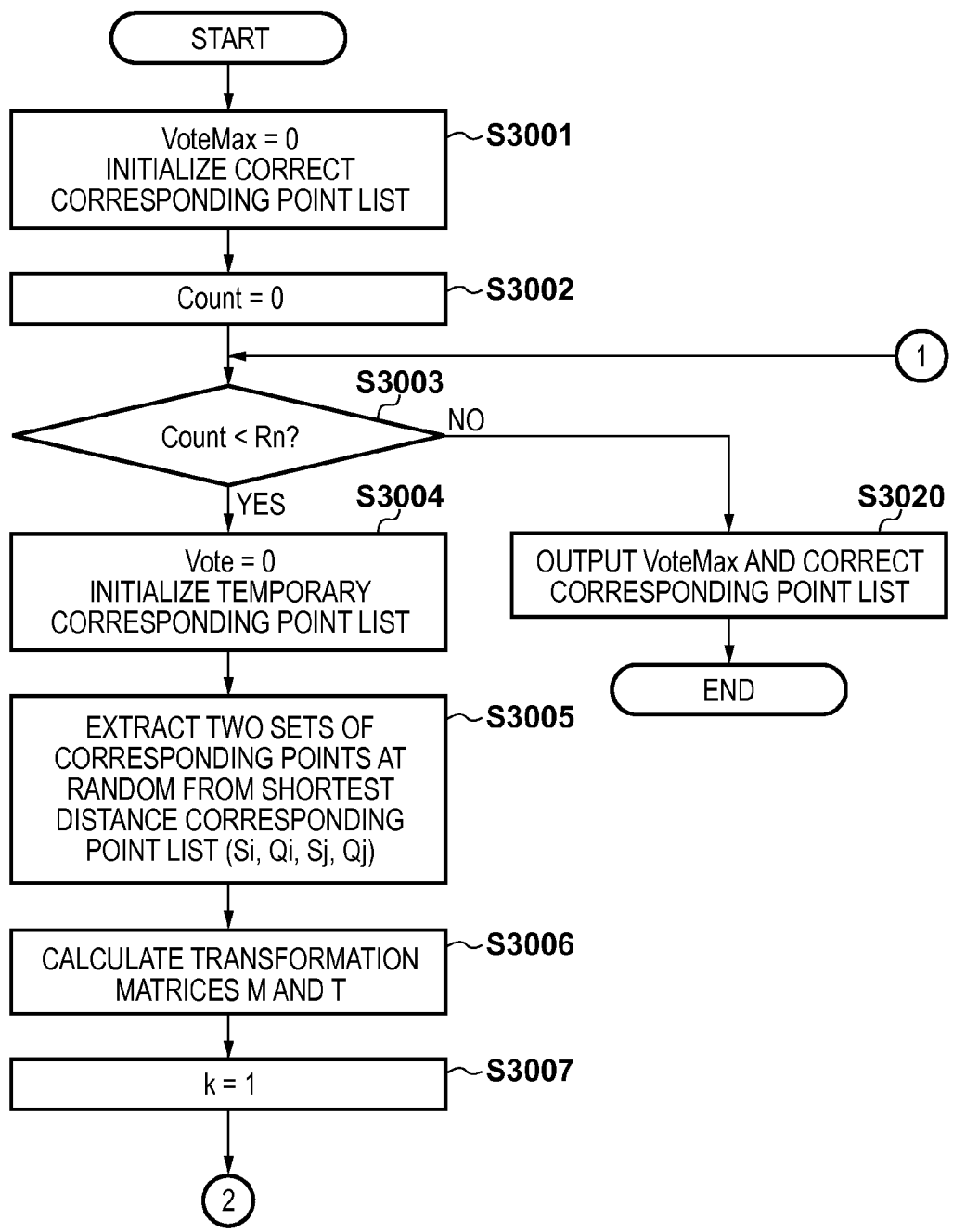
FIGS. 26A and 26B are flowcharts showing a correct corresponding point list creation processing procedure according to the third embodiment.
Figure 26B:
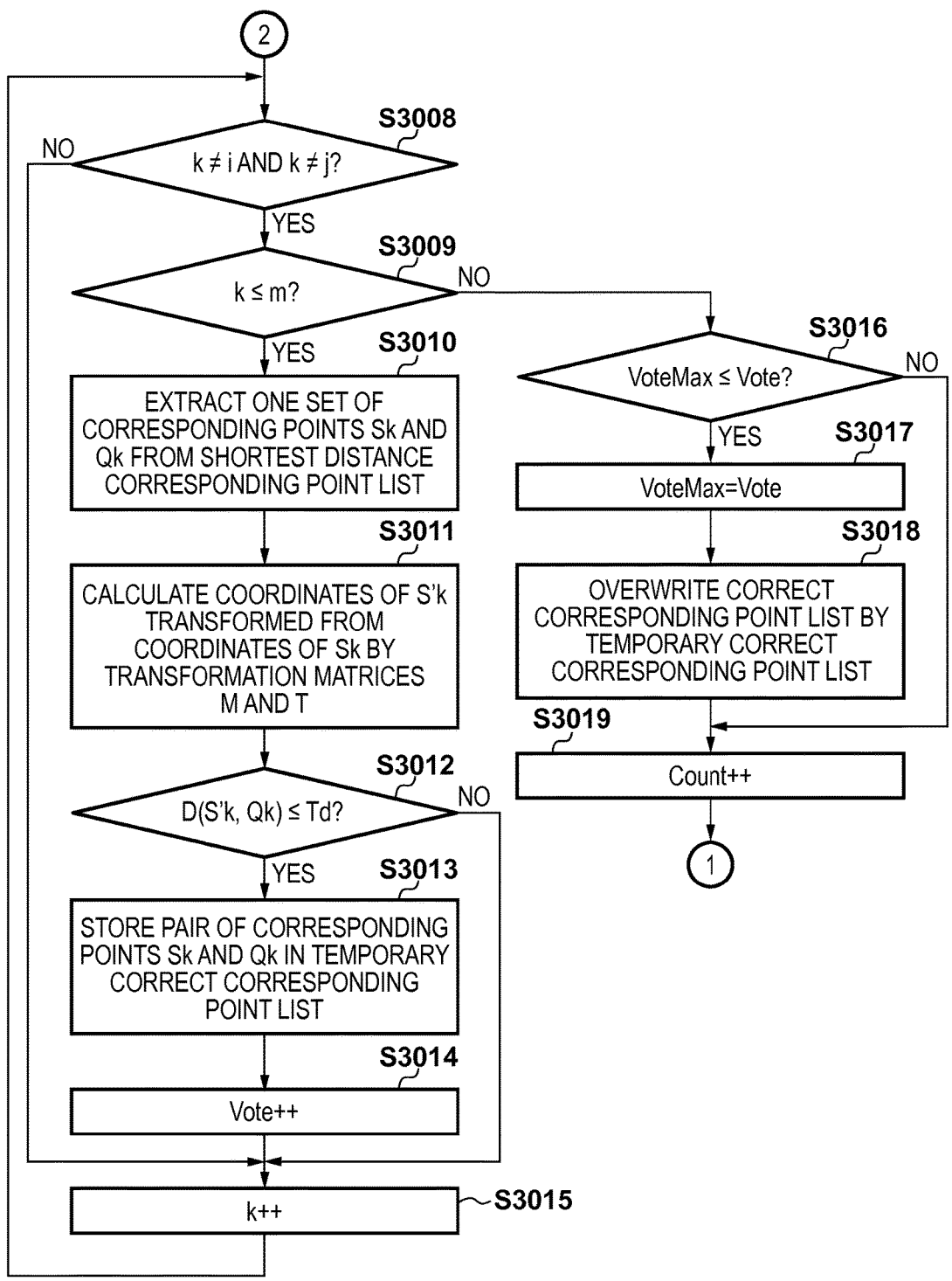

FIGS. 26A and 26B are flowcharts showing an example of a correct corresponding point list creation processing procedure in step S2802. A method to be explained here is a method called RANSAC (RANdom SAmple Consensus).

In step S3001, a variable VoteMax representing the final number of votes is initialized to 0. In step S3002, a variable Count representing the iterative count of similarity calculation processing is initialized to 0.

If the iterative count Count does not exceed a maximum iterative processing count Rn in step S3003, the process advances to step S3004 to initialize a variable Vote representing the number of votes to 0. In step S3005, two sets of corresponding points are extracted at random from the shortest distance corresponding point list. A case where the ith corresponding points and the jth corresponding points are extracted from the shortest distance corresponding point list will be described here. The feature point IDs of the ith corresponding points are Qi and Si, and their coordinates are (x'i, y'i) and (xi, yi), respectively. The feature point IDs of the jth corresponding points are Qj and Sj, and their coordinates are (x'j, y'j) and (xj, yj), respectively.

In step S3006, assuming that the extracted corresponding points Qi(x'i, y'i), Si(xi, yi), Qj(x'j, y'j), and Sj(xj, yj) meet the variables in $$\begin{pmatrix} x'_k \\ y'_k \end{pmatrix} = \begin{pmatrix} a & b \\ c & d \end{pmatrix} \begin{pmatrix} x_k \\ y_k \end{pmatrix} + \begin{pmatrix} e \\ f \end{pmatrix} \tag{11}$$

and variables a to f in equation (11) are obtained.

However, in step S3006 of FIG. 26A, a matrix formed from the variables a to d is represented by M, and a matrix formed from the variables e and f is represented by T.

In the first embodiment, only similarity transformation is considered for the sake of simplicity. At this time, equation (11) is rewritten as $$\begin{pmatrix} x'_k \\ y'_k \end{pmatrix} = \begin{pmatrix} a & -b \\ c & a \end{pmatrix} \begin{pmatrix} x_k \\ y_k \end{pmatrix} + \begin{pmatrix} e \\ f \end{pmatrix} \tag{12}$$

At this time, using x'i, y'i, xi, yi, x'j, y'j, xj, and yj, the variables a, b, e, and f are given by $$a = \frac{(x_i - x_j)(x'_i - x'_j) + (y_i - y_j)(y'_i - y'_j)}{(x_i - x_j)^2 + (y_i - y_j)^2} \tag{13}$$

$$b = \frac{(x_i - x_j)(y'_i - y'_j) - (y_i - y_j)(x'_i - x'_j)}{(x_i - x_j)^2 + (y_i - y_j)^2} \tag{14}$$

$$e = \frac{(y'_i - y'_j)(x_i y_j - x_j y_i) - (x'_i + x'_j)(x_i x_j + y_i y_j) + x'_i(x_j^2 + y_j^2) + x'_j(x_i^2 + y_i^2)}{(x_i - x_j)^2 + (y_i - y_j)^2} \tag{15}$$

$$f = \frac{(x'_i - x'_j)(y_i x_j - y_j x_i) - (y'_i + y'_j)(y_i y_j + x_i x_j) + y'_i(y_j^2 + x_j^2) + y'_j(y_i^2 + x_i^2)}{(x_i - x_j)^2 + (y_i - y_j)^2} \tag{16}$$

In step S3007, a corresponding point selection variable k is initialized to 1. In step S3008, it is determined whether k is neither i nor j to select points other than the two sets of points extracted at random from the shortest distance corresponding point list in step S3005. If k is i or j, the process advances to step S3015 to increment k and then returns to step S3008. If k is neither i nor j, the process advances to step S3009 to determine whether the corresponding point selection variable k does not exceed the number m of sets of corresponding points registered in the shortest distance corresponding point list. If the corresponding point selection variable k exceeds the number m of sets, the process advances to step S3016. This will be described later. Upon determining in step S3009 that the corresponding point selection variable k does not exceed the number m of sets of corresponding points registered in the shortest distance corresponding point list, the process advances to step S3010. In step S3010, points other than the two sets of points Si and Qi, and Sj and Qj extracted at random from the shortest distance corresponding point list in step S3005 are extracted from the shortest distance corresponding point list. In the third embodiments, the extracted points are represented by Sk and Qk and their coordinates are (xk, yk) and (x'k, y'k).

In step S3011, coordinates (uk, vk) of a point S'k moved from the coordinates (xk, yk) of the point Sk using equation (12) are obtained.

In step S3012, the geometric distance between the coordinates (uk, vk) of the point S'k and the coordinates (x'k, y'k) of the point Qk is calculated as a Euclidean distance, and it is determined whether the Euclidian distance is equal to or smaller than a threshold value Td. If the Euclidian distance is equal to or smaller than the threshold value Td, the process advances to step S3013 to store the corresponding point information of the two images in a temporary correct corresponding point list. In step S3014, the number Vote of votes is incremented, and the process advances to step S3015. If the Euclidian distance is larger than the threshold value Td, the process advances to step S3015 without performing any processing. In step S3015, the corresponding point selection variable k is incremented, and the process returns to step S3008. The above-described processing is repeated until the corresponding point selection variable k exceeds the number m of sets of corresponding points registered in the shortest distance corresponding point list.

Step S3016 that is processing executed when the corresponding point selection variable k exceeds the number m of sets of corresponding points registered in the shortest distance corresponding point list in step S3009 will be described next. In step S3016, the value of the number Vote of votes and the value of the final number VoteMax of votes are compared. If the value of the number Vote of votes is larger than the value of the final number VoteMax of votes, the process advances to step S3017. In step S3017, the value of the final number VoteMax of votes is replaced with the value of the number Vote of votes. In step S3018, the correct corresponding point list is replaced with the temporary correct corresponding point list. After that, in step S3019, the iterative count Count is incremented, and the process returns to step S3003 described above.

If the value of the number Vote of votes is equal to or smaller than the value of the final number VoteMax of votes in step S3016, the process advances to step S3019. The iterative count Count is incremented, and the process returns to step S3003 described above.

If the iterative count Count exceeds the predetermined maximum iterative processing count Rn in step S3003, the process advances to step S3020 to output the final number VoteMax of votes and the correct corresponding point list, and the processing ends.

Note that the similarity calculation method according to the third embodiment has been described in consideration of only similarity transformation. However, it is possible to cope with any other geometric transformation such as affine transformation by obtaining a transformation matrix according to the transformation in step S3006. In, for example, affine transformation, first, three sets of corresponding points are extracted at random in step S3005. In step S3006, not equation (12) but equation (11) is used. The variables $a$ to $f$ are obtained using the three sets of corresponding points (a total of six points) selected in step S3005.

Figures 24, 25:
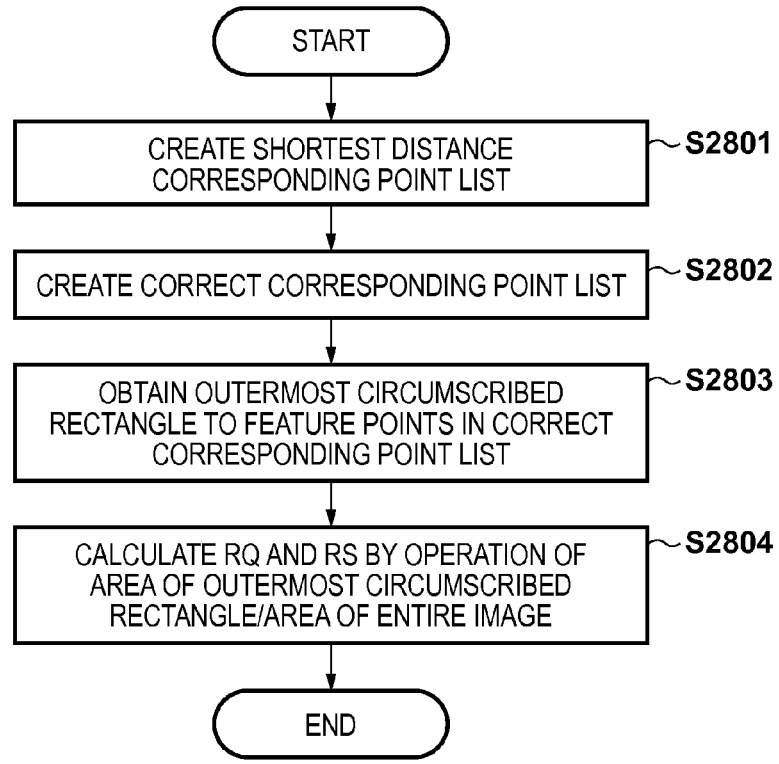
FIG. 24 is a flowchart showing a matching region specifying processing procedure according to the third embodiment.
FIG. 25 is a view showing an example of a schema of a shortest distance corresponding point list according to the third embodiment.

The correct corresponding point list creation processing in step S2802 of FIG. 24 thus ends. Referring back to the procedure of FIG. 24, in step S2803, the outermost circumscribed rectangles of the image to be processed and the search result image are obtained based on the coordinates of the feature points in the correct corresponding point list. The minimum and maximum values of each of the x- and y-coordinates of each feature point in the correct corresponding point list are obtained. A rectangle surrounded by two points (minimum value of x-coordinate, minimum value of y-coordinate) and (maximum value of x-coordinate, maximum value of y-coordinate) is obtained as the outermost circumscribed rectangle.

In step S2804, the area of the outermost circumscribed rectangle is divided by the area of the entire image, thereby obtaining the inclusion ratio RQ of the matching region in the image to be processed and the inclusion ratio RS of the matching region in the search result image.

[Search Processing]

Figure 27:
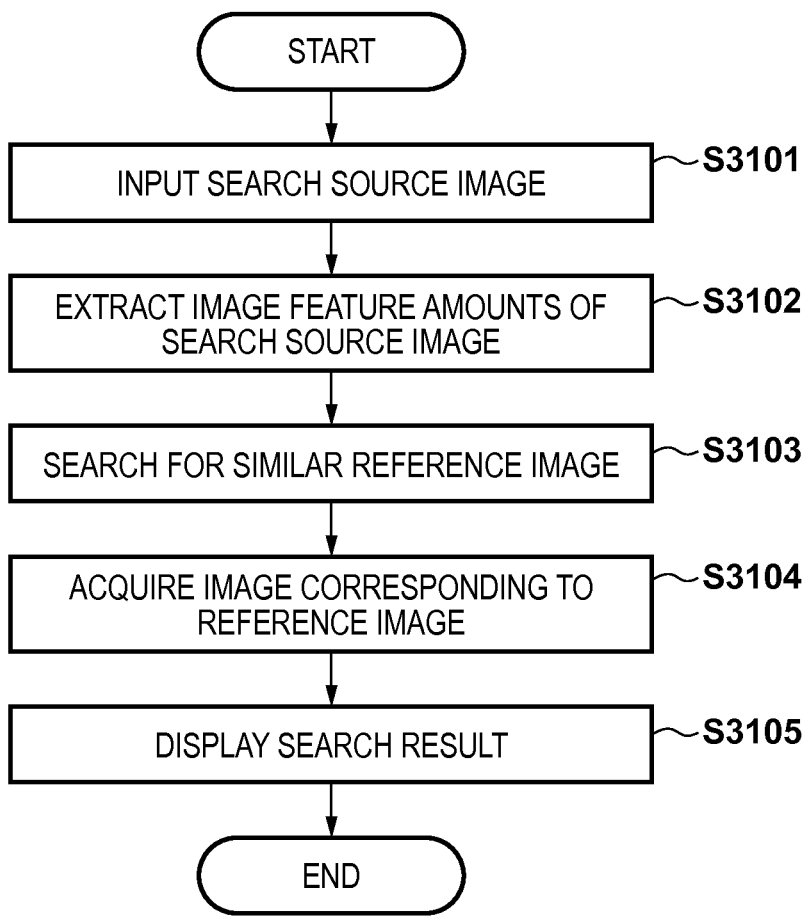
FIG. 27 is a flowchart showing an example of a search processing procedure according to the third embodiment.

FIG. 27 is a flowchart showing an example of a search processing procedure in the image processing apparatus according to the third embodiment.

In step S3101, a search source image (query image) is input via the image input unit 1201. In step S3102, the image feature amount calculation unit 1204 extracts the image feature amounts of the search source image. The image feature amount extraction processing in step S3102 is the same as the processing in step S1408 of FIG. 12.

In step S3103, using the image feature amounts calculated in step S3102 as a search source, the image searching unit 1205 compares them with the image feature amounts of an already registered reference image and searches for a similar reference image. The similar reference image search processing in step S3103 is the same as the processing in step S1801 of FIG. 14. In the similar reference image search processing, comparison with the image feature amounts of already registered reference images is performed, and similarities are calculated. A result sorted in the descending order of similarity is obtained.

In step S3104, the image searching unit 1205 acquires image IDs corresponding to the reference image ID found in step S3103. As shown in FIG. 15A, 17, or 22A, a plurality of image IDs are associated with each reference image ID. All image IDs corresponding to the reference image ID are acquired.

Finally in step S3105, the images acquired in step S3104 are displayed together with the similarities.

In the above example, the similarities of images corresponding to a reference image are displayed as the same value. However, the similarities may be adjusted based on the region information. For example, when acquiring image IDs registered in correspondence with the reference image ID found in step S3103, the inclusion ratio of the reference image in the image of each image ID is obtained. The similarity may be adjusted based on the inclusion ratio, and a result sorted in the order of similarity may be output again. In addition, the number of feature points may be stored for each reference image, and the similarities may be adjusted based on the number of feature points.

In the above example, a search result image and its similarity are displayed as a search result. However, which region is the same region as the search source image may be displayed based on the region information.

As described above, in the third embodiment, it is determined whether a target image to be registered is an allocation image. If the image is an allocation image, each of the allocated original images (reference images) is registered. At this time, if a reference target image to be registered is similar to an already registered reference image, link information to the already registered reference image is registered. Hence, when the same image is registered a plurality of times, registration in a small storage area can be performed without any influence on the search result. In addition, even images including different numbers of allocated pages can be registered in a small storage area by registering link information on a page basis.

Fourth Embodiment

The fourth embodiment will be described below. In the third embodiment, in step S1402 of FIG. 12 that is processing at the time of image registration, allocation image determination of an input image is performed based on setting information of a printer driver or operation information of a printer or a multi function peripheral. In the fourth embodiment, an example in which allocation image determination is performed by analyzing (region-segmenting) an input image will be described.

Figure 28:
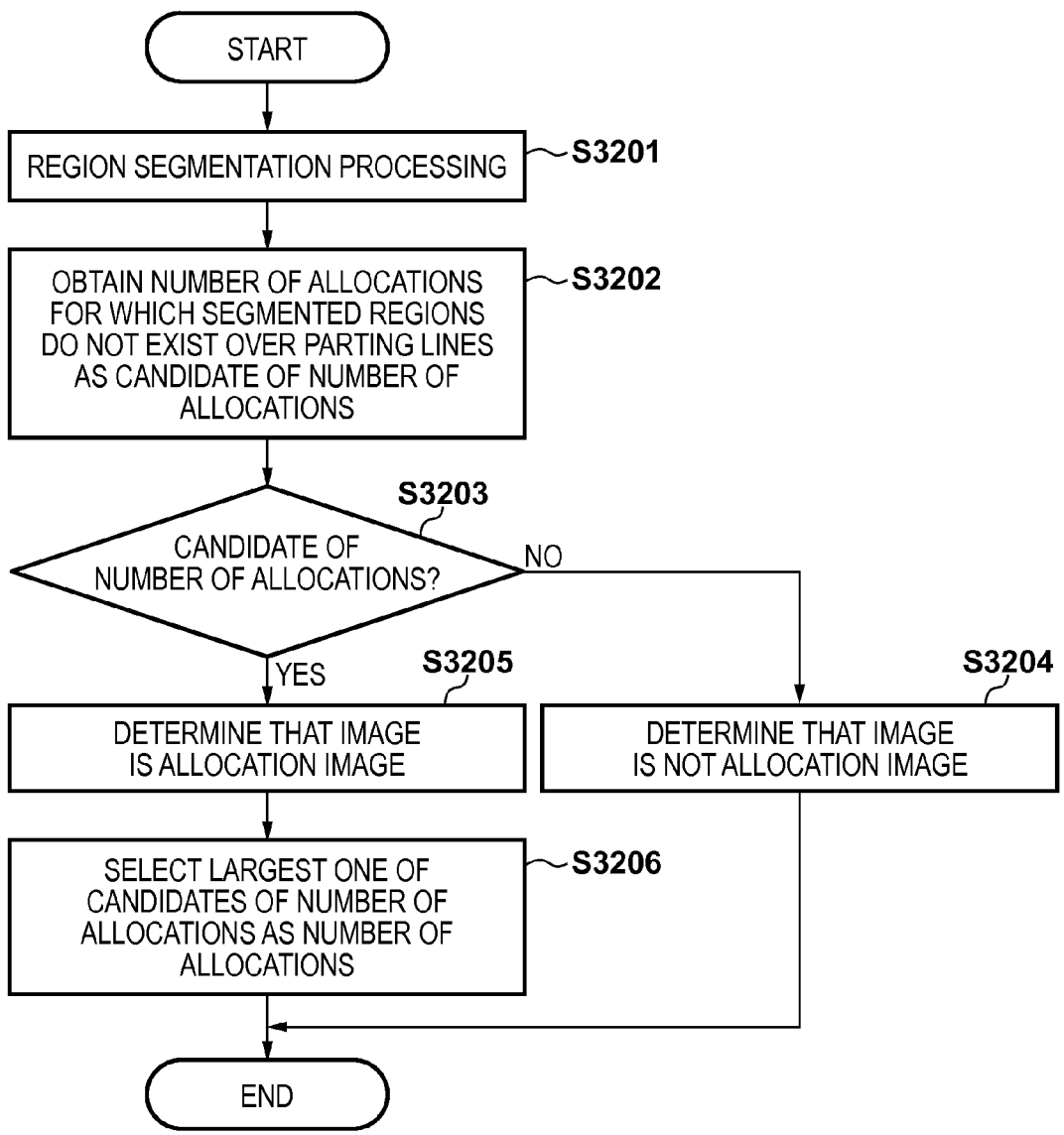
FIG. 28 is a flowchart showing an allocation image determination processing procedure according to the fourth embodiment.

FIG. 28 is a flowchart showing an example of an allocation image determination processing procedure for an input image in an image processing apparatus according to the fourth embodiment.

In step S3201, an input image is analyzed, and region segmentation processing (or rectangular region decision processing) is performed. In region segmentation processing, for example, an image 3301 shown in FIG. 29 is recognized as blocks of meaningful regions, as indicated by 3302. The attributes ((TEXT)/(PICTURE)/(PHOTO)/(LINE)/(TABLE) and the like) of the regions are determined, thereby dividing the image into regions having different attributes.

An example of region segmentation processing will be described here in detail. First, an input image is binarized into a monochrome image. Outline tracing is performed in the resultant binary image to extract a block in which pixels surrounded by a black pixel outline continue. For a black pixel block having a large area, outline tracing is performed for white pixels in the block as well to extract a white pixel block. In addition, a black pixel block is recursively extracted from a white pixel block having a predetermined area or more.

Rectangular regions that circumscribe thus obtained black pixel blocks are classified by the size and shape into regions having different attributes. For example, a region having an aspect ratio close to 1 and a size falling within a predetermined range is recognized as a pixel block corresponding to a character. If characters in close vicinity are arranged in line, the rectangular regions are connected into a group, and the rectangular region group is defined as a text region. As for pixel blocks other than character regions, a flat pixel block is defined as a line region. The range of a black pixel block including rectangular white pixel blocks having a predetermined size or more and arranged in line is defined as a table region. A region in which pixel blocks in indefinite shapes scatter is defined as a photo region, and a pixel block having any other arbitrary shape is defined as a picture region.

Figure 30A:
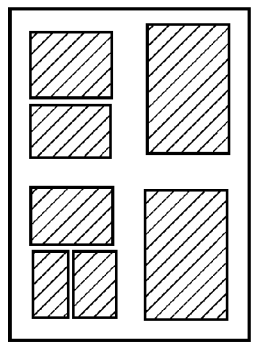
FIGS. 30A to 30G are views showing examples of division positions when the image of the region segmentation result is allocated and divided according to the fourth embodiment.
Figure 30B:
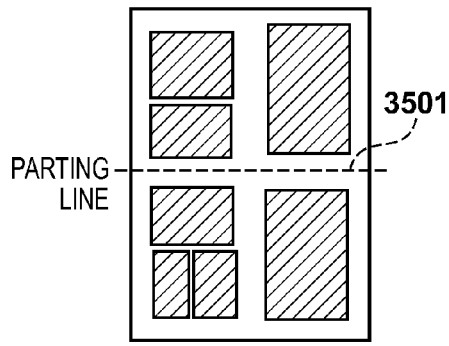
Figure 30C:
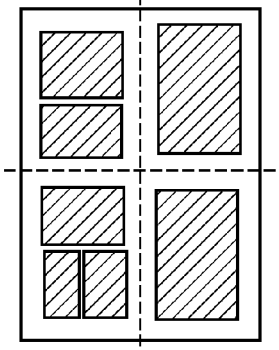
Figure 30D:
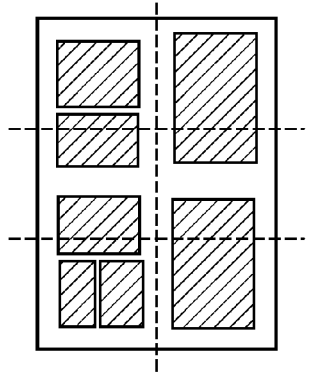
Figure 30E:
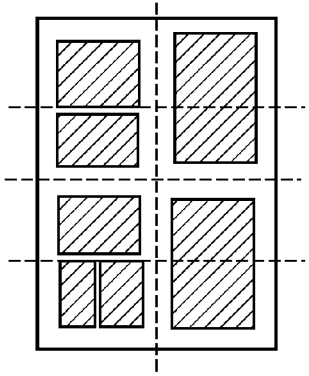
Figure 30F:
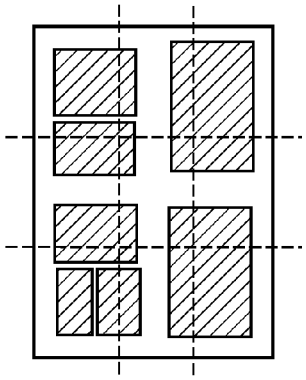
Figure 30G:
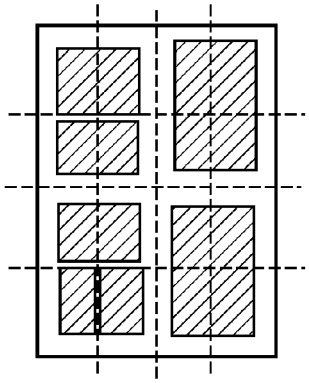

In step S3202, a candidate of the number of allocations is acquired based on the segmented regions. First, whether the input image can be divided by a predetermined division method is considered. FIGS. 30A to 30G show examples. FIG. 30A is a view showing a state in which region segmentation has been performed. FIGS. 30B to 30G are views showing division positions of the image that is sequentially divided into 2 to 16 parts, which are indicated by broken lines (3501 and the like). These pieces of information are assumed to be stored in a storage device such as a hard disk in advance. Here, the lines will be referred to as parting lines (also serving as page boundary positions). At this time, it is checked whether a segmented region exists over a parting line (whether a region is located over two pages). As can be seen, no regions exist over the parting lines in FIGS. 30B and 30C. As can be seen, some regions exist over the parting lines in FIGS. 30D to 30G. Hence, in this example, candidates of the number of allocations are {2, 4}.

If no candidate of the number of allocations exists in step S3203, the process advances to step S3204 to determine that the image is not an allocation image, and the processing ends. If a candidate of the number of allocations exists in step S3203, the process advances to step S3205 to determine that the image is an allocation image. In step S3206, the largest one of the candidates of the number of allocations is selected as the number of allocations, and the processing ends. In the above example, since the candidates of the number of allocations are {2, 4}, "4" that is larger is determined as the final number of allocations.

As described above, in the fourth embodiment, an input image is analyzed (region-segmented), thereby determining the number of pages included in an image to be processed. This makes it possible to perform allocation image determination for an input image and register each reference image even if setting information of a printer driver or operation information of a device is absent.

Fifth Embodiment

The fifth embodiment will be described below. In the third and fourth embodiments, an input image is assumed to be an allocation image of a document image. In the fifth embodiment, an example will be described in which not an allocation image but an image in which a plurality of images are pasted in a 1-page document is input. Here, the image may indicate only a natural image but may include a drawing or a line drawing. An image of a text may also be included. In this case, each pasted image is registered.

FIG. 31 is a flowchart showing an example of a registration processing procedure in an image processing apparatus according to the fifth embodiment. This procedure is similar to that in FIG. 12, and the same step numbers as in FIG. 14 denote the same processes. Only different processes will be explained here.

In step S3502, region segmentation processing of an input image is performed. The region segmentation processing is the same as in step S3201 of FIG. 28. In steps S3503 and S3510, the process branches depending on whether it is determined that a plurality of regions exist. In step S3505, the number N of regions is acquired. In step S3506, region division is performed. In this region division, processing of extracting the regions obtained in step S3502 is performed. In step S3509, registration processing of the image to be processed is performed.

FIG. 32 is a flowchart showing an example of an image registration processing procedure in step S3509. This procedure is similar to that in FIG. 14, and the same step numbers as in FIG. 14 denote the same processes. Only different processes will be explained here.

In step S3605, an inclusion ratio RQ of the matching region in the image to be processed is compared with an inclusion ratio RS of the matching region in the search result image, and if the ratios are not almost the same, the process advances to step S1803 to register the image feature amounts of the image to be processed. Processes corresponding to steps S1807 to S1811 of FIG. 14 are not performed.

As described above, in the fifth embodiment, when a plurality of images are pasted in a 1-page document, each pasted image (reference image) is registered. At this time, if a reference target image to be registered is similar to an already registered reference image, link information to the already registered reference image is registered. Hence, even when the same image is pasted in different documents, registration in a small storage area can be performed by registering link information on an image basis.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-083095 and No. 2014-083097, both filed Apr. 14, 2014 which are hereby incorporated by reference herein in their entirety.

What is claimed is:

1. An image register apparatus comprising:
   a first holding unit configured to hold, in association with each other, local feature amounts of an image and information that specifies the image including the local feature amounts;
   a second holding unit configured to hold, in association with each other, information that specifies a registered image whose local feature amounts are held by said first holding unit and information that specifies a similar image similar to a partial region of the registered image;
   a searching unit configured to search registered images for an image partially similar to an input target image to be registered; and
   a register unit configured to, when a search result image obtained by the search of said searching unit includes the target image to be registered, exclude the target image to be registered from a holding target of said first holding unit, and register, in association with each other, information that specifies the search result image in said second holding unit and information that specifies the target image to be registered.

2. The apparatus according to claim 1, wherein if the image partially similar to the target image to be registered cannot be obtained by said searching unit, said register unit registers the local feature amounts of the target image to be registered and information that specifies the target image to be registered in said first holding unit.

3. The apparatus according to claim 1, wherein if the target image to be registered includes the search result image, said register unit registers the local feature amounts of the target image to be registered and information that specifies the target image to be registered in said first holding unit.

4. The apparatus according to claim 3, wherein said register unit deletes the search result image included in the target image to be registered from said first holding unit and registers, in association with each other, the information that specifies the target image to be registered in said second holding unit and the information that specifies the search result image.

5. The apparatus according to claim 3, wherein said register unit registers, in said first holding unit, difference local feature amounts from local feature amounts already managed by said first holding unit out of the local feature amounts of the target image to be registered.

6. The apparatus according to claim 1, wherein said second holding unit further holds position information representing which portion of the registered image the similar image matches.

7. The apparatus according to claim 1, wherein said first holding unit holds index information of images commonly having similar local feature amounts.

8. The apparatus according to claim 1, wherein defining a larger one of images having an inclusion relationship as a reference image, said second holding unit holds, in association with each other, information that specifies the reference image and information that specifies the image included in the reference image.

9. The apparatus according to claim 1, wherein said searching unit determines a similarity of the image using RANSAC and outputs a search result.

10. The apparatus according to claim 1, wherein the local feature amounts of an input query image are searched from said first holding unit, and an image similar to an image having the local feature amounts obtained as a result of the search is searched from said second holding unit.

11. The apparatus according to claim 1, wherein the local feature amounts of an input query image are searched from said first holding unit, and position information of a portion similar to the query image in an image similar to an image having the local feature amounts obtained as a result of the search is searched from said second holding unit.

12. A control method of an image register apparatus, comprising:
    a first holding step of holding, in association with each other, local feature amounts of an image and information that specifies the image including the local feature amounts;
    a second holding step of holding, in association with each other, information that specifies a registered image whose local feature amounts are held in the first holding step and information that specifies a similar image similar to a partial region of the registered image;
    a search step of searching registered images for an image partially similar to an input target image to be registered; and
    a register step of, when a search result image obtained by the search in the search step includes the target image to be registered, excluding the target image to be registered from a holding target in the first holding step, and registering, in association with each other, information that specifies the search result image in the second holding step and information that specifies the target image to be registered.

13. A non-transitory computer-readable storage medium storing a program that is loaded and executed by a computer so as to cause the computer to execute each step of a method of claim 12.

* * * * *